US007032787B2

(12) United States Patent
Sherk, Jr. et al.

(10) Patent No.: US 7,032,787 B2
(45) Date of Patent: Apr. 25, 2006

(54) INTEGRATED DISPENSER

(75) Inventors: William M. Sherk, Jr., 258 Greenmount Blvd., Dayton, OH (US) 45419; Edwin Chan, Brooklyn, NY (US); Marco Perry, Brooklyn, NY (US); Richard C. Shonfeld, High Peak (GB)

(73) Assignee: William M. Sherk, Jr., Dayton, OH (US)

( * ) Notice: Subject to any disclaimer, the term of this patent is extended or adjusted under 35 U.S.C. 154(b) by 277 days.

(21) Appl. No.: 10/426,948

(22) Filed: Apr. 30, 2003

(65) Prior Publication Data

US 2003/0213820 A1 Nov. 20, 2003

Related U.S. Application Data

(60) Provisional application No. 60/376,915, filed on May 1, 2002.

(51) Int. Cl.
*G01F 11/028* (2006.01)

(52) U.S. Cl. .................. 222/441; 222/156; 222/355

(58) Field of Classification Search ............. 222/344, 222/355, 361–367, 441, 156–159, 541, 518
See application file for complete search history.

(56) References Cited

U.S. PATENT DOCUMENTS

| | | | | |
|---|---|---|---|---|
| 1,361,146 A | * | 12/1920 | Egnatoff | ................... 222/184 |
| 1,607,530 A | * | 11/1926 | Guest | ........................ 222/441 |
| 2,815,153 A | * | 12/1957 | McCarthy | .................. 222/441 |
| 3,808,939 A | | 5/1974 | Ashbrook | |
| 4,289,258 A | | 9/1981 | Ransom | |
| 4,376,499 A | | 3/1983 | Ostergaard | |
| 4,579,256 A | | 4/1986 | Heimlich | |
| 4,971,229 A | | 11/1990 | Heimlich | |
| 5,419,071 A | | 5/1995 | Fatica | |
| 5,563,734 A | * | 10/1996 | Wolfe et al. | ................. 359/360 |
| 5,685,461 A | | 11/1997 | Mitchell | |
| 5,855,300 A | | 1/1999 | Malki | |
| 5,934,573 A | * | 8/1999 | Weterrings et al. | ......... 239/650 |
| 6,145,705 A | | 11/2000 | Wallace et al. | |
| 6,189,742 B1 | * | 2/2001 | Thomson et al. | ........... 222/339 |
| 6,315,170 B1 | | 11/2001 | Thomson et al. | |
| 6,450,371 B1 | | 9/2002 | Sherman et al. | |

* cited by examiner

*Primary Examiner*—Gene Mancene
*Assistant Examiner*—Melvin A. Cartagena
(74) *Attorney, Agent, or Firm*—Dinsmore & Shohl LLP

(57) ABSTRACT

A dispenser for powdered, granular or related fluent materials. The dispenser includes a reservoir and an actuation mechanism that together define a housing, or enclosure. The reservoir sealingly contains a fluent material such that the contents are not easily contaminated or tampered with. User-imparted relative movement between cooperating parts of the actuation mechanism and reservoir enables a predetermined and repeatable quantity of the fluent contents to be discharged from the dispenser and onto a desired area, such as a food product. The dispenser is configured as a disposable device such that, after depletion of the fluent material contents arising out of a multiplicity of uses, it can be thrown away.

42 Claims, 19 Drawing Sheets

INTEGRATED DISPENSER

This application claims the benefit of U.S. Provisional Application No. 60/376,915 filed May 1, 2002.

BACKGROUND OF THE INVENTION

The present invention relates generally to a device for dispensing a metered amount of powdered or granular material, and more particularly to a sealed, hand-held disposable dispenser for consistent dosing of the powdered or granular material such that upon depletion of the contents, the dispenser may be thrown away.

Free-flowing powdered and granular substances (alternately referred to as part of a larger class known as fluent materials) are used extensively for myriad applications, and dispensers for such materials are well-known in the art. Examples include devices configured to discharge gunpowder, salt, sugar, spices, powdered dairy creamer or the like. Some of these devices dispense a metered, or predetermined amount of fluent material, while others permit the operator to determine how much of a desired product is dispensed.

An important segment of the fluent material market relates to food, medicines and dietary supplements, the latter of which may include, among other things, vitamins and related digestible health-related products. These materials are often used to improve the health or general nutritional levels of humans or animals. Frequently, such fluent materials are mixed in with palatability enhancers to reduce or eliminate the often objectionable taste experience associated with the fluent material, and thus increase the likelihood that the material actually reaches its destination. The problem of delivery is especially acute in animals, young children, the elderly and people with physical or mental frailties, in that they often display reluctance to consume materials that they cannot comprehend the need for, or that they sense are undesirable or difficult to swallow. In such cases, the use of palatability enhancers can be significant in determining whether a particular dosing session will be successful. Patients in hospitals, assisted living communities, nursing homes and related facilities often have the benefit of trained personnel to ensure that the patient receives the proper dosage of medicine or dietary supplement. Similarly, domesticated animals, such as dogs, cats and horses, under the care of a veterinarian or other trained personnel within an animal care facility are reasonably assured of receiving appropriate dosages. Continued assurance of proper dosing can continue if the services of a nutritionist (in the case of dietary supplements), pharmacist (in the case of medicines) or veterinarian (in the case of animals) are employed to prepare pre-measured dosages and place them in a container tailored to the pre-measured amount. Necessarily, all of the aforementioned situations add to the overall cost of the medicine or supplement. In any event, when humans and animals are placed back within their respective domestic environments and away from trained personnel, they must often rely on untrained personnel for their dosages of medicine or dietary supplement. In the case of human users, this dosage is often self-administered.

Dry fluent materials are not the only class of materials used to deliver medicines and dietary supplements. Others include gases, liquids (including pastes and gels) and generally rigid objects (such as tablets or pills). Each has positive and negative aspects. For example, gases, while capable of rapid entry into the blood stream, require complex delivery systems that are heavy and difficult to move. Liquids, typically easier to swallow than pills if palatable, are nonetheless messy and sometimes difficult to dispense. Rigid objects are effective ways to pre-dose materials, but are sometimes hard to consume due to physiological or psychological reasons. While dry fluent materials can often be less expensive than when in rigid form, and less messy than a comparable liquid or gas, traditional methods of dispensing them have entailed some difficulties.

Three general methods have been used in dispensing fluent powder materials. In the first method, a dispenser is filled with material and dispensed, typically repeatedly, in user-defined quantities; examples include conventional salt and pepper shakers. This method does not create consistency in dispensing, as it relies more on visual or related indicia of what constitutes a satisfactory amount of dispensed product. In the second method, a container is manually opened, and a measurement instrument (such as a measuring cup, measuring spoons or syringe) is used to retrieve a user-defined amount of product. As with the first method, the dispensed quantity is often ascertained by visual methods, and can be aided by graduated markings or the like on the measurement instrument. In the third method, pre-filled dispensers, such as spout-based boxes, are used. In this case, the contents are accessed, such as by tilting or shaking the container. Typically, this method can either be combined with a measurement instrument, as discussed in conjunction with the second method, or involve the use of graduated markings integral with the container.

In each of these methods, the user makes visual estimates of the amount to be dispensed, and must employ varying degrees of manual dexterity to dispense the proper amount of product. For example, cumbersome measuring devices with finely-graduated markings to indicate dosage make use inconvenient, especially for those suffering from mental or physical impairments, such as poor eyesight or lack of fine motor control. Similarly, if the measuring and dispensing devices are made up from a variety of small disparate components, the chance of them becoming separated from one another and lost is greater than if part of a unitary structure. Dispensing units designed to be reused are typically are not permanently sealed, as the access and fill ports necessary to replenish the fluent material supply also provide a path for external contaminants, including dust, microbes and water. These units are also vulnerable to inadvertent access by animals or people unaware of the nature of the contents, as the barrier between the contents and the external environment could be compromised or removed, thus permitting potentially dangerous access to large quantities of fluent materials.

In other forms, existing dispensers have overly complex construction, requiring multiple pieces or exotic structures, many of which are not compatible with low-cost manufacture or one-time (disposable) use. By way of example, such dispensers may include variable dosing features that allow user to dial in a prescribed amount such that each activation may dispense a different amount of fluent material. In addition, even with a positive cut-off of flow of the material, some residual amount is left behind, which can create a mess when knocked from the dispenser and onto an adjacent surface. Accordingly, all of the general methods are believed to suffer from one or more of the following deficiencies: waste and mess due to inefficiency of use; susceptibility to contamination and tampering; overly costly construction; and inability to dispense consistent dosages.

Accordingly, there exists a need for a dispenser whereby a metered amount of powdered or granular material is reliably and repeatably dispensed. Similarly, there exists a need for a hand-held dispenser and fluent material as an integrated system that is configured such that an untrained user can accurately and repeatably dispense a predetermined amount of such material. There also exists a need for an integrated dispenser and fluent material system such that upon depletion of the fluent material contents, the dispenser may be thrown away. Moreover, there exists a need for an integrated system that protects the materials being dispensed from elements and contamination, as exogenous elements hinder efficacy, while contamination can cause health and usage problems.

SUMMARY OF THE INVENTION

The present invention satisfies these needs by integrating the fluent material to be dispensed with an inexpensive, simple-to-use device such that consistent, repeatable quantities of the fluent material can be dispensed by an untrained operator. By having the operator avoid all contact with the fluent material contents, the risk of contamination to the contents is greatly reduced.

According to a first aspect of the present invention, a disposable dispenser is provided. The dispenser includes a reservoir configured to sealingly contain a fluent material, and an actuation mechanism operatively coupled to the reservoir. The reservoir comprises a storage compartment and a discharge compartment in selective fluid communication with the storage compartment. The actuation mechanism that selectively places storage and discharge compartments into fluid communication with one another includes a biased articulating member such that together the reservoir and the actuation mechanism are configured to alternately fill and discharge the discharge compartment. The actuation mechanism is such that in a first actuation position the discharge compartment is in fluid communication with the storage compartment, and in a second actuation position the discharge compartment is in fluid communication with the ambient environment.

Optionally, the dispenser is of predominantly plastic construction. In the present context, the dispenser is "predominantly" plastic in that the bulk of the housing making up its structure is plastic, while it will recognized by those skilled in the art that discrete components, such as the biasing spring and pin making up the hinge, could be other materials, such as metal. At least one portion may be of transparent plastic to facilitate visual identification of the amount of fluent material remaining in the dispenser. For example, the reservoir may be made from a transparent plastic, and may further include one or more optical treatments, such as a light filter, to inhibit ultraviolet breakdown of the fluent material contents due to exposure to sunlight or the like. The light filter can be made from, for example, a low emissivity coating or colorations in the transparent plastic. Labels (for identification of the fluent material product contained within the dispenser) can be adhered to the dispenser, and may include viewing ports to achieve protection against the light while still providing visual identification of the amount of fluent material remaining in the dispenser. For example, a vertically elongate cut-out in the label could allow a user to visually identify remaining product (thus making it readily apparent that it is time for the user to purchase more product), but block out a majority of the light. Similarly, the label can include die cut portions such that the user can selectively peel back the part of the label circumscribed by the die cut to be able to visually ascertain how much product remains. The sealing configuration of the disposable dispenser arises out of a connection between a cover through which the fluent material may be added to the reservoir and a fill aperture located in the reservoir.

Preferably, the cover includes features that ensure a secure connection between it and the reservoir at the time of dispenser manufacture that make such connection "permanent", such that the cover cannot be removed from the finished dispenser without damaging the dispenser. Accordingly, in the present context, a connection that is "permanent" includes configurations where the process of separating the connected pieces will necessarily entail damage to either of both pieces, or where the subsequent containment properties are severely compromised. This situation is especially acute in fluent materials intended for human or animal consumption, in that by avoiding contamination of the fluent material contents due to the ambient environment, accident or tampering, the utmost in material purity and efficacy is maintained. In the present invention, promotion of permanent connection between the cover and the reservoir can be by snap-fit engagement between the two. Other connection methods, such as a screw-on, or threaded, cover (which is not traditionally thought to define a permanent connection) can be made permanent by including locking threaded engagement such that once the complementary threads on the cover and reservoir surface engage each other beyond a certain point, tabs (or related detents) can deploy to prevent a reversal of the screwed-on configuration. This permanent relationship between the cover and the dispenser forms the basis for a sealingly contained fluent material. In the present context, a fluent material is "sealingly" contained within a reservoir or similar compartment or enclosure when once placed inside, contact between the fluent material and the ambient environment outside the reservoir is substantially cut off until the material is discharged from the dispenser. That the fluent material is sealingly contained does not necessarily require complete isolation of the fluent material, as trace amounts of air, moisture and minute-sized particulate matter from the ambient environment may still bypass the cover and lodge within the reservoir. In addition to tight component fits in locations in the dispenser where the fluent material is expected to contact the ambient environment (such as inlet and discharge apertures), enhanced sealing can be achieved by placing a layer of compliant sealant material between mating surfaces of one or more of these components. Examples of materials that can be used include, but are not limited to, polypropylene, polyethylene, ethylene vinyl acetate (EVA), natural or synthetic rubbers or silicone. The compliant nature of the material, disposed as a thin layer between engaged surfaces (for example, the cover and an aperture in the dispenser) promotes a substantially sealed fit between them. In one form, the material can be configured similar to that of a material disposed on the inner surface of a bottle caps to seal contents therein. With the addition of the sealing materials, the dispenser can exhibit enhanced (although not necessarily absolute) levels of air and water tightness. This sealing containment, made possible by the permanent connection between the cover and the reservoir, is to help ensure that once the fluent material is placed within the dispenser and the cover is in place, the dispenser cannot be reopened without causing significant damage, thereby providing readily-apparent indicia that the fluent material contents may be tainted. As such, a dispenser configured to sealingly contain fluent material necessarily excludes devices that are equipped with lids, covers and caps that can be repeatedly connected to or removed from their complementary access ports on the dispenser, even if the device is otherwise not easily disassembled. In another configuration, sealing containment for the fill (inlet) aperture can be effected by a sealing membrane placed across the aperture after the fluent material has been loaded into the dispenser. The sealing membrane may be attached by conventional methods, such as by adhesive, and shaped to allow placement of a cover (such as those described and shown in the present disclosure) over the membrane and dispenser without the need for special cover treatment, such as the aforementioned sealant material.

Preferably, the discharge compartment is defined by a predetermined volumetric capacity, where the capacity of the discharge compartment is preferably up to approximately one tablespoon (14.8 cubic centimeters in the United States, or 14.2 cubic centimeters in the United Kingdom), and more preferably approximately one-eighth to one teaspoon (0.6 to 4.8 cubic centimeters, respectively in the United States, or 0.5 to 4.6 cubic centimeters, respectively in the United Kingdom). The selective fluid communication between the storage compartment and the discharge compartment can be by gravity-feed, such that if the storage compartment is located vertically above the discharge compartment, the introduction of an aperture between them will permit the fluent material to flow from the former to the latter. A mounting base can be included such that when placed in cooperation with the lower portion of the dispenser, they prevent inadvertent discharge of the fluent material. The mounting base may comprise an inverted T-member such that when engaged with the dispenser, a detent on the base blocks the discharge aperture. In addition, the dispenser may also include a groove-like channel disposed circumferentially such that a lip extending from the mounting base can engage the channel to effect a secure fit between the dispenser and the base. The mounting base may also include a trough-like lower surface that can catch and hold excess fluent material. The selective fluid communication between the discharge compartment and the storage compartment is preferably effected by a flow cutoff member disposed between them. In this regard, the flow cutoff member acts like a valve, such as a gate valve. In another option, the discharge compartment and the storage compartment are integrally formed with one another such that a unitary piece of structure extends between the flowpath-defining regions of each compartment. The dispenser may further include an engaging notch disposed on a lower surface of the actuation mechanism to allow the dispenser to partially rest on a receptacle that is to receive the fluent material By way of example, the notch can be positioned on the rim of a bowl or cup to increase the accuracy of the fluent material placement. The biased articulating member on the actuation mechanism is preferably a spring, such that together with the remainder of the actuator mechanism, acts like a hinged handle, although it will be appreciated by those skilled in the art that other configurations are possible. By way of example, instead of having pivotally joined members squeezed together, the dispenser may include a spring-biased thumb-grippable protruding member that slides along a linear, slotted race.

In another option, the reservoir and actuation mechanism together form a single housing such that the two halves are of relatively equal size, shape and volume. In this configuration, the dispenser may further include a pair of cutoff members for the storage compartment, one extending from the reservoir and the other extending from the actuation mechanism such that they can overlap one another. Preferably, the apertures in the two cutoff members substantially align while the dispenser is in its first actuation position so that the fluent material from the storage compartment can pass through the flowpath formed by the aligned apertures and into to the discharge compartment. When the dispenser is in the second actuation position, the storage compartment discharge apertures are substantially misaligned such that flow of the fluent material from the storage compartment to the discharge compartment is impeded. In addition, the dispenser may further comprise cutoff members in the discharge compartment that are configured similar to those of the storage compartment mentioned above, such that the discharge compartment cutoff members are configured to overlap one another at least during one of the first or second actuation positions. Selectively aligned/misaligned apertures in each of the discharge compartment cutoff members function to either allow or impede fluent material flow out of the discharge compartment.

In yet another option, the biased articulating member is disposed between the reservoir and actuation mechanism such that they are configured to move axially relative to one another along their respective substantially elongate dimensions. A protruding tongue (or similar finger-grippable member) may be placed on at least one of the reservoir or the actuation mechanism such that when the tongue is depressed, relative movement between the reservoir and the actuation mechanism is effected. Preferably, the discharge compartment is substantially flush with a lower surface of the reservoir while the dispenser is in the first actuation position, forming a generally planar bottom. The discharge compartment, by virtue of being extended axially during the second actuation position, extends vertically below the reservoir to expose the discharge compartment to the ambient environment.

In still another option, the biased articulating member (in the form of the aforementioned spring) is operatively coupled between the reservoir and the actuation mechanism such that upon compression of the spring, the actuation mechanism pivots about an axis common to the substantially elongate dimension of both the reservoir and actuation mechanism to place the dispenser in the second actuation position. In this configuration, the connection between the spring, reservoir and the remainder of the actuation mechanism is arranged along a pair of concentric tubular members such that the relative axial movement between the reservoir and the actuation mechanism made possible by depressing one relative to the other also produces a screw-like twisting of one relative to the other, producing a rotational component to the translational movement. This rotational component distinguishes between the first and second actuation positions, as the spring biases the reservoir and the actuation mechanism to a first actuation position such that fluent material present in the storage compartment can flow to the discharge compartment. By depressing the reservoir relative to the actuation mechanism, the second actuation position is enabled, which due to the misalignment between flowpaths in the storage compartment and the discharge compartment, coupled with the alignment of flowpaths between the discharge compartment and the ambient environment, allows a metered quantity of fluent material to be dispensed. The dispenser is further configured such that upon the return of the spring to a neutral, uncompressed state, the dispenser is reset to its first actuation position.

According to yet another aspect of the invention, an integrated dispensing system is disclosed. The integrated system includes a dispenser according to the previous embodiment plus a fluent material disposed in at least a portion of the reservoir. By providing an integrated system where the fluent material contents are substantially sealed from the environment under factory-controlled conditions, a user is assured of content integrity. Preferably, the fluent material is a dry material, such as a dietary supplement or medicine. General granular size of the fluent material can be tailored to aperture dimensions in the dispenser promote consistent flowability. As discussed previously, the dispenser is configured to dispense a consistent amount of fluent material with each use. In the event the amount of material needed to meet the dietary or medical requirement is insufficient to fill the dispensing chamber, then insipient and other fillers may be added to ensure consistent dosing possible for a particular size of animal or human user. In addition, agglomeration of the material can be used to transform finely divided particles into particles of larger size, thereby improving flowability, solubility and dosing, storage and handling of the fluent material. Factors that effect the flow characteristics of the fluent material, including humidity, static conditions and van der Waals forces, may all play a role in determining the level of integration between the dispenser and the fluent material contents. For example, techniques may be used to reduce residual static electricity in the dispenser. Various agglomeration techniques that are well-known in the art, including compression, mixing or agitation, extrusion, sintering or hot melting or forming, can be used to effect various bridging, locking or reacting between particles. By using agglomeration in conjunction with the features of the dispenser to craft an integrated dispenser, it is possible to tailor the fluent material flow, size and metering properties to particular user needs for optimized system performance. Materials incorporated in the dispenser are made to specifications such that the materials are, to a reasonable extent, able to fall into the dispensing chamber via gravity in a consistent manner. Materials can be of substantially the same granular size and may include one or more ingredients that will inhibit material caking. In addition to agglomeration techniques, the fluent materials may be coated or uncoated depending on usage requirements, such as the differentiation of tablets and coated pills. Labelling can be applied to the dispenser such that instructions, warnings, the fluent materials, as well as insipient ingredients used as fillers, anti-caking materials or the like, may be included.

The integrated dispenser has numerous consumer benefits. For example, the material and the dispenser are provided in tandem, thus there is no need for the consumer to fill or otherwise transfer material to the dispenser. The dispenser is sealed to protect against contamination and to extend the shelf-life of the fluent material. The dispenser also, through a closure detent on the mounting base, has a safety lock to prevent accidental discharge of the fluent material contents, allowing the dispenser to be free standing. The size and ergonomic features of the dispenser allow it to be used with one hand, thus facilitating use by individuals with otherwise limited capacity to dispense a predetermined quantity of fluent material product. Other features, such as a "time to buy" view hole, tracking information and ingredient labeling and required information add to its utility. The dispenser can provide appropriate dosages within very close tolerances, and the dispensing procedures are similar for all materials by use within a particular animal or human category. The integrated dispenser also has numerous benefits to the retail trade, such as consistent packaging by product category, uniqueness, easy to explain use directions and breadth of product line.

According to still another aspect of the present invention, a method of dispensing a fluent material is disclosed. The method includes the steps of configuring a dispenser to contain fluent material, grasping the dispenser such that it is situated above an area to receive the fluent material and actuating the dispenser such that the fluent material is discharged from the reservoir and onto the area. The structural configuration can be made similar to that of the previously-defined aspects of the invention. Preferably, the fluent material is sealed in the dispenser. Also, as with the previous aspects, the fluent material is preferably a dietary supplement or medicine for human or animal use, although the method is equally appropriate for other uses, such as dispensing reagents, cleaning products, household chemicals or the like. Additionally, the fluent material can be dispensed in discrete quantities. By way of the previously-mentioned examples, the discharge compartment can be sized to dispense fluent material in approximately one-eighth to one teaspoon increments, although larger quantities, such as one tablespoon (or more) increments are within the scope of the present invention.

According to another aspect of the present invention, a method of packaging a fluent material is disclosed. The method includes configuring a dispenser according to the first aspect of the invention, filling the reservoir (previously described) with the fluent material, and sealing the fluent material contained within the dispenser. Optionally, the fluent material is a dry powdered or granular material, and is more preferably a dietary supplement or medicine. Another option includes configuring a quantity of fluent material to have specific agglomeration features similar to those mentioned in regard to the aforementioned integrated dispensing system. As an additional step, one or more labels can be placed on the dispenser, where such label at least includes dosing instructions. Additionally, a mounting base may be fitted to the lower portion of the dispenser. Moreover, the method may include the additional steps of providing readily-apparent indicia on the dispenser. Examples of such indicia can include the nature of the fluent material contained therein, and instructions for use. In addition, a cover used to sealingly contain the fluent material is configured to be permanently connected to the reservoir.

BRIEF DESCRIPTION OF THE SEVERAL
VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
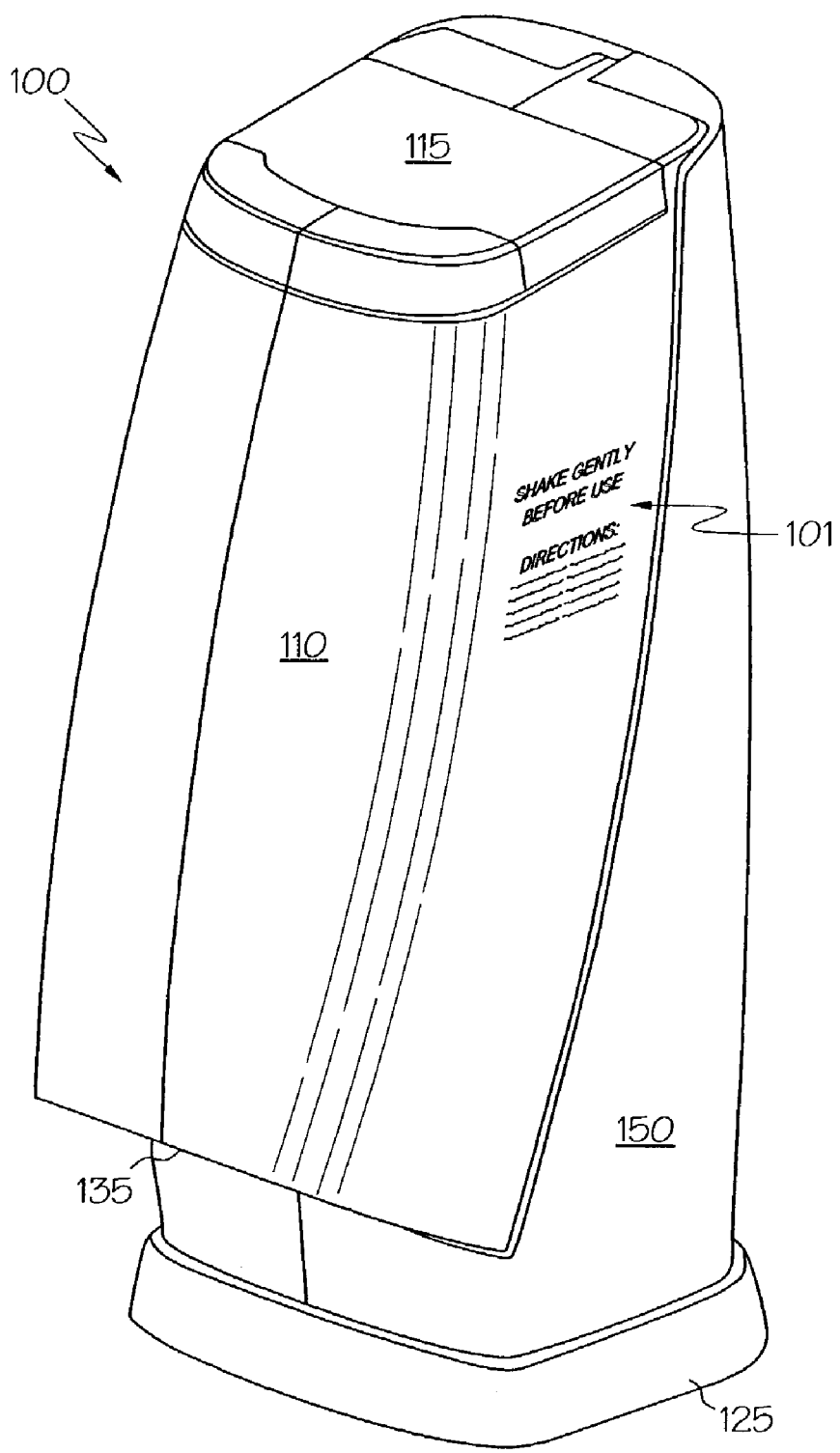
FIG. 1 illustrates a perspective view of an embodiment of a dispenser of the present invention in a first, non-actuated position.

Referring initially to FIG. 1, a dispenser 100 according to an embodiment of the present invention is shown. Dispenser 100 includes a reservoir 110 attached to an actuation mechanism 150, a cover 115 attached to reservoir 110, a mounting base 125 and engaging lip 135. Mounting base 125 is removable from the dispenser 100. Printed indicia 101 (such as directions, warning labels, ingredient lists or the like) may be applied on the external surface of dispenser 100. The outer edges and corners of dispenser 100 can be rounded as shown to impart improved aesthetic and user handling features. It will be appreciated by those skilled in the art that the remaining embodiments may include similar attributes, even if not shown in the figures.

Figure 2:
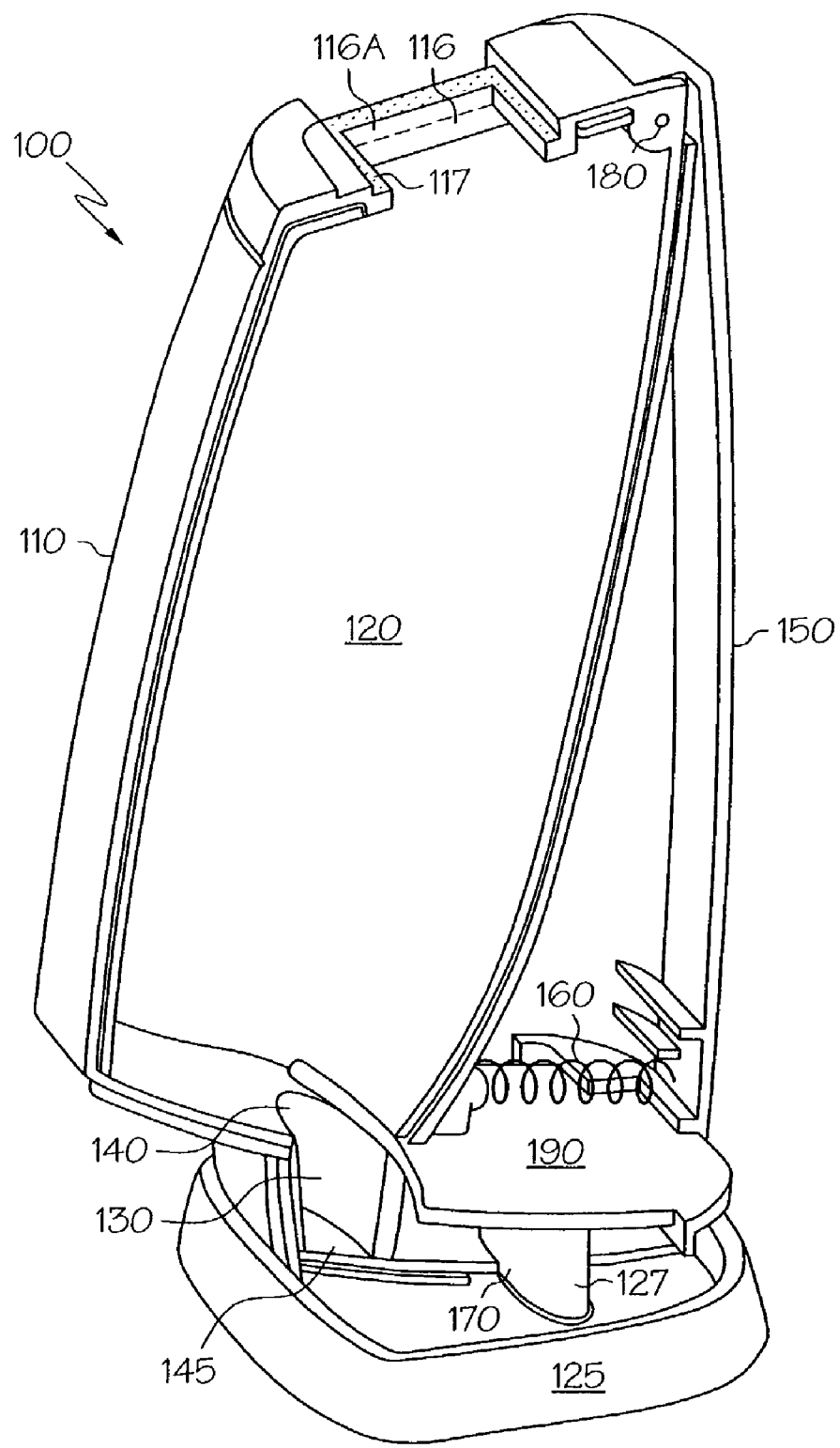
FIG. 2 illustrates a cutaway view of the dispenser of FIG. 1.
Figure 3:
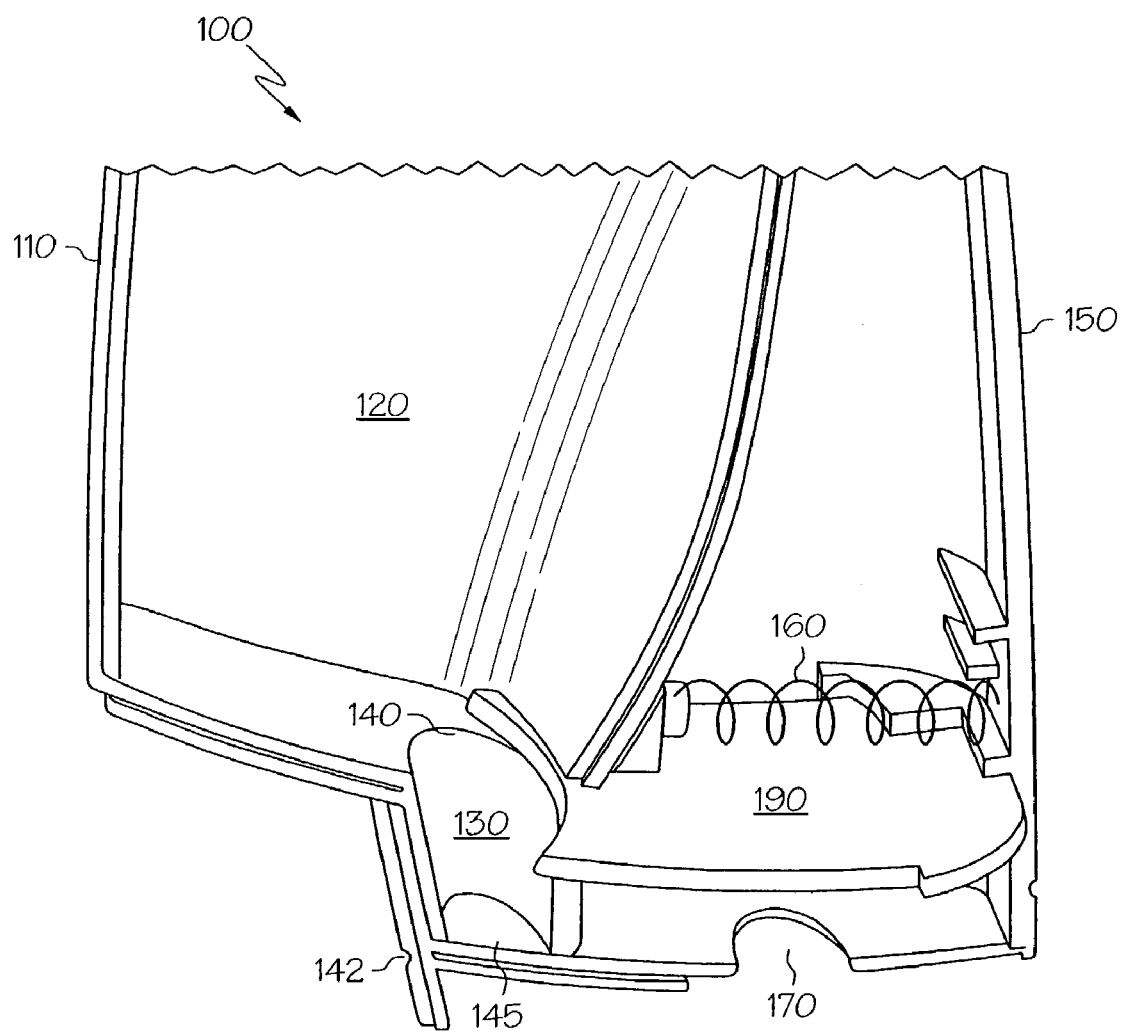
FIG. 3 illustrates a detail view of some of the internal features of the dispenser of FIG. 1.

Referring next to FIGS. 2 and 3, cutaway views highlight the internal features of the reservoir 110 and the actuation mechanism 150. Reservoir 110 includes a storage compartment 120 into which fluent material can be poured through aperture 116 defined in reservoir 110. Other variations on the connection between the cover 115 and the portion of reservoir 110 adjacent apertures 116 are discussed in more detail below. Slots 116A disposed on exterior-facing opposing lateral surfaces adjacent aperture 116 can accept complementary projecting members (discussed in more detail below) to cover aperture 116, thereby effecting a tight-fitting, secure arrangement between cover 115 and reservoir 110. The bottom of storage compartment 120 includes a storage compartment discharge aperture 140 that establishes fluid communication between storage compartment 120 and a discharge compartment 130. Discharge compartment 130 is sized to accept a predetermined amount of fluent material. For example, if the fluent material includes a medicine, food product or dietary supplement meant for human or small animal consumption, the predetermined amount that discharge compartment 130 can hold may range from fractions of a teaspoon, such as one-eighth, one-fourth, or one-half of teaspoon, up to a teaspoon. Similarly, if the fluent material is for large animal consumption (such as a horse), the discharge compartment 130 can be sized accordingly, such as in the tablespoon (or larger) range. It will be appreciated by those skilled in the art that the size of the discharge compartment 130 can be tailored to the specific need, and that such sizes are within the scope of the present invention. It will also be appreciated by those skilled in the art that the fluent material need not be limited to those for human or animal consumption, as the dispenser is equally applicable to use with fluent materials used as cleaning agents, chemical reagents, fertilizer, herbicides or the like. The bottom of discharge compartment 130 includes a discharge compartment discharge aperture 145 that, upon removal of mounting base 125, is in fluid communication with the ambient environment such that upon discharge of the fluent material from discharge compartment 130, the fluent material drops, by the force of gravity, onto the desired area. Actuation mechanism 150 includes a housing defined by a generally hollow cavity and a hinge 180. The reservoir 110 and actuation mechanism 150 are connected together at hinge 180. The relative positioning between the reservoir 110 and the actuation mechanism 150 is in two preferred states: a fill (first actuation) position and a dispense (second actuation) position. The dispenser 100 is biased to the fill position; however, upon grasping and squeezing by a user, reservoir 110 hingedly moves into the hollow cavity of actuation mechanism 150 to effect the dispense position. Mounting features built into the walls of the housing are used to secure the actuation members together, and include flow cutoff member 190 and spring 160 (which is alternately referred to as a bias mechanism). Spring 160 biases the dispenser 100 to assume the fill position that gravity feeds fluent material into discharge compartment 130 from storage compartment 120. Dispenser discharge aperture 170 is the final effluent point for the fluent material contained within dispenser 100 and, upon alignment with discharge compartment discharge aperture 145 while dispenser 100 is in its second actuation position, doubles as an engaging location for a closure detent 127 (not presently shown) that protrudes from mounting base 125. A layer of sealant material 117 can be placed at intake and discharge locations on the dispenser to effect improved sealing. As shown with particularity in FIG. 2, sealant material 117 is placed around the generally planar upper surface surrounding aperture 116, while in FIG. 3, a layer of sealant material 117 can be placed discharge compartment 130 so that upon engagement with closure detent (shown and described later), enhanced sealing is effected.

Figure 4:
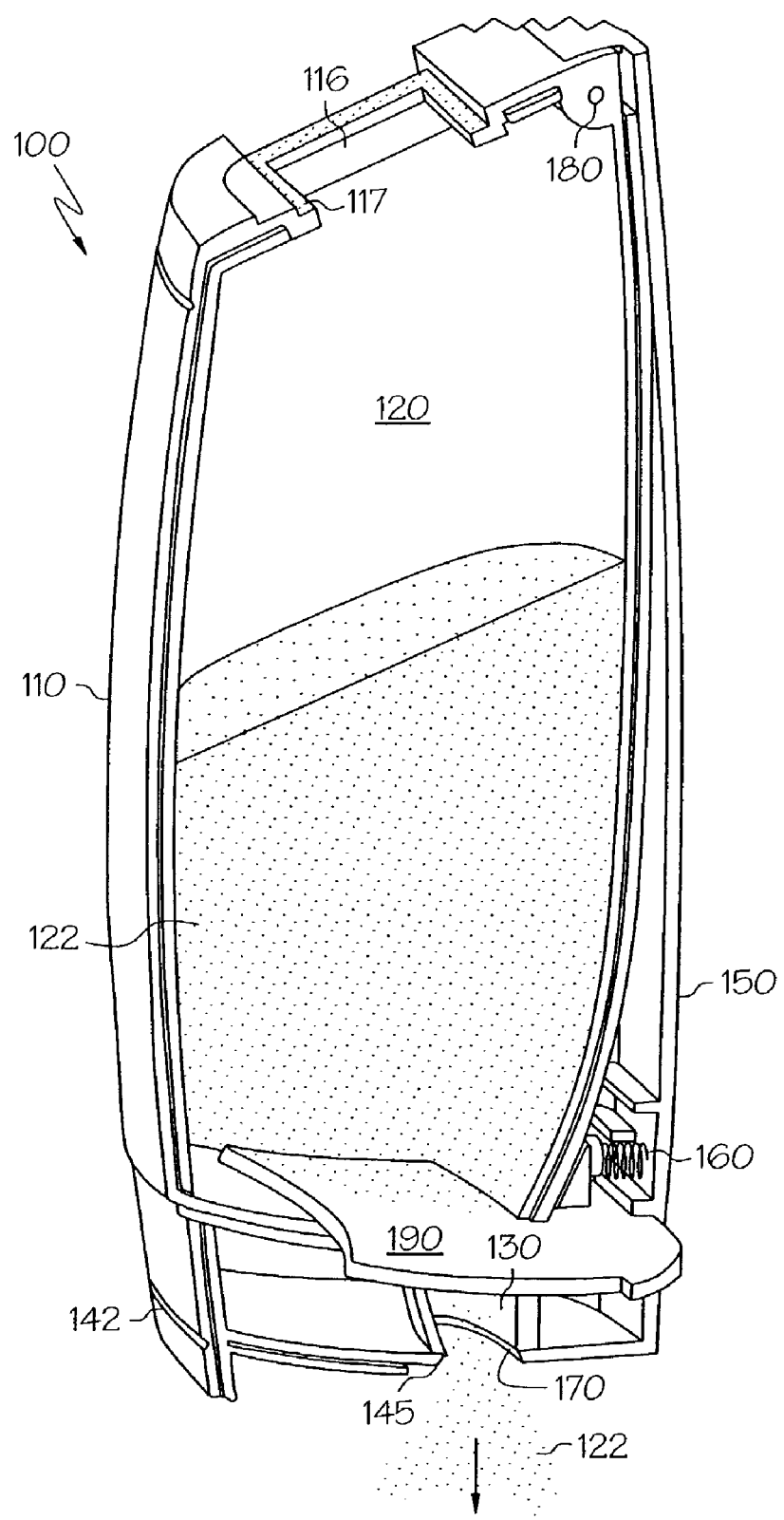
FIG. 4 illustrates a cutaway view of an embodiment of a dispenser of the present invention in a second, as-actuated position such that a portion of the fluent material contained within is dispensed.

Referring next to FIG. 4, the dispenser 100 with fluent material 122 contained in storage compartment 120 is shown in operation in the dispense position, such that when gripped and squeezed, reservoir 110 pivotally swings toward actuation mechanism 150. As can be seen in the figure, when dispenser 100 is in the dispense position, the bias in spring 160 is overcome to put it into compression. The flow cutoff member 190 includes a substantially constant radius of curvature (up to and including a flat piece) that is disposed between reservoir 110 and actuation mechanism 150 such that when the dispenser is squeezed into the dispense position, the storage compartment discharge aperture 140 (not presently shown) in the lower surface of storage compartment 120 passes underneath flow cutoff member 190 so that the fluid communication between the storage compartment 120 and the discharge compartment 130 is temporarily halted. This simultaneously places the discharge compartment discharge aperture 145 (shown in FIGS. 2 and 3) of discharge compartment 130 into fluid communication with dispenser discharge aperture 170, thus providing a gravity-based flowpath from which the fluent material 122 may exit the dispenser 100.

Figure 5:
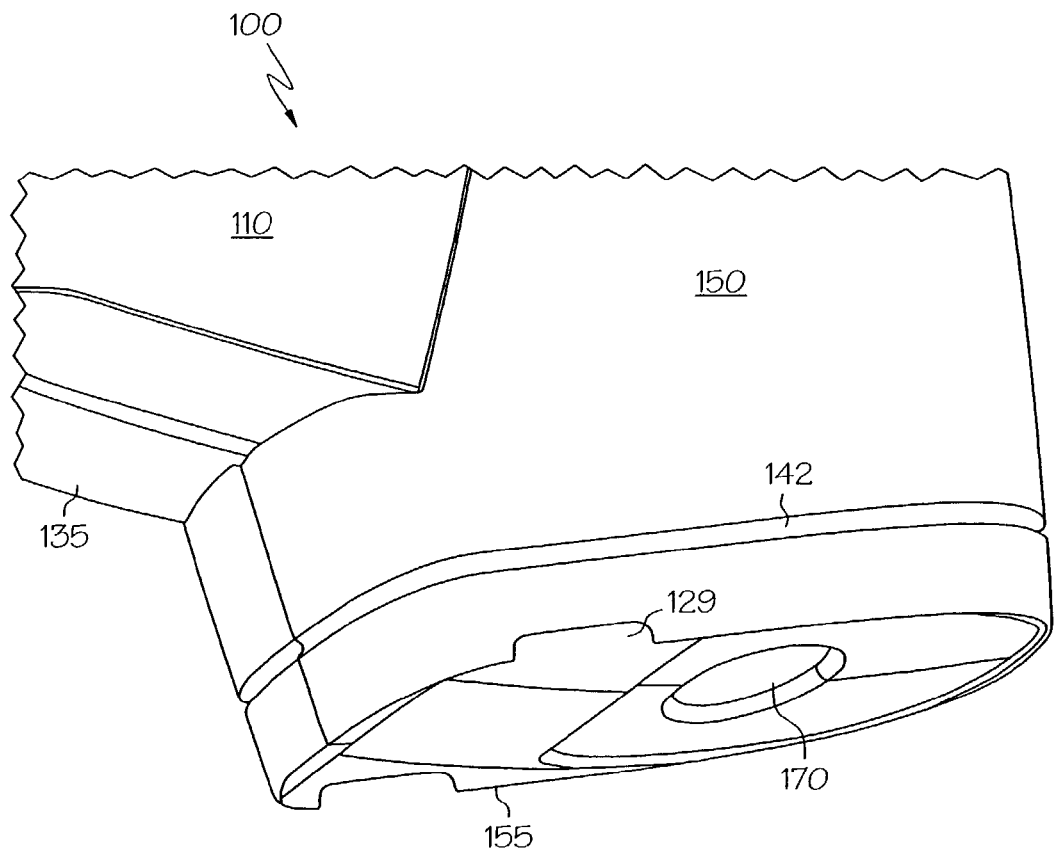
FIG. 5 illustrates a perspective view showing a mounting base engaging section at the bottom of the dispenser.

Referring next to FIG. 5, a bottom perspective view highlights how the lower surfaces of the dispenser 100 may be used to facilitate additional securing between the dispenser 100 and a container, such as a bowl, cup, glass or related drinking or eating receptacle, into which the fluent material is to be dispensed. Engaging lip 135 defines a lower surface of reservoir 110. Engaging notch 129 is defined as a cutout along the lower ridge 155 that defines another lower surface of actuation mechanism 150; both structures allow the user to partially rest the dispenser 100 onto the receptacle (not shown) to improve the stability of the relationship between the two prior to placing the dispenser 100 into dispense position. This is especially valuable for users who have difficulty maintaining a steady position between the dispenser 100 and the receptacle. Channel 142 is circumferentially disposed about the lower portion of dispenser 100 and can be used in conjunction with lip 126 of mounting base 125 (discussed in more detail below) when the dispenser 100 is not in use. The material making up the lower portion of dispenser 100, including the portion defining dispenser discharge aperture 170, can be less compliant than the material making up mounting base 125 (not presently shown) such that, upon engagement between the two, a sealing fit is effected. Furthermore, in a manner similar to that shown in FIGS. 2 and 3, sealant material can be placed on a surface defining dispenser discharge aperture 170 for enhanced sealing.

Figure 6:
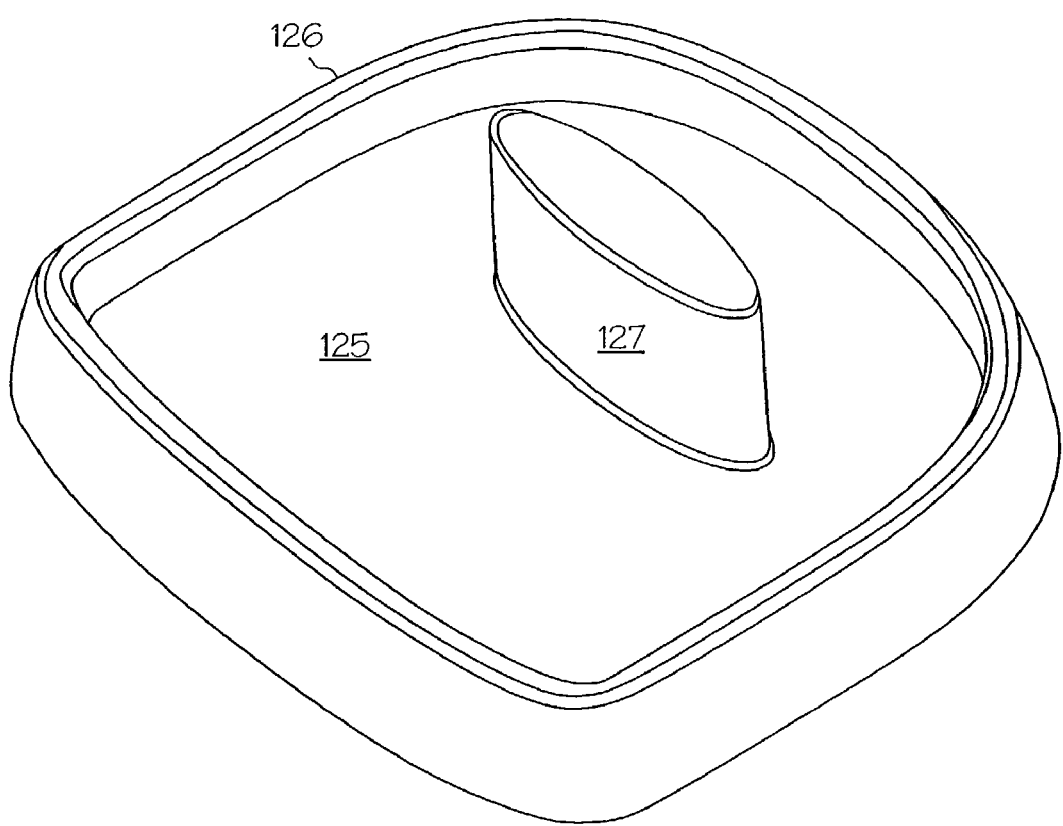
FIG. 6 illustrates a perspective view of a mounting base configured to engage the dispenser of FIG. 1.

Referring next to FIG. 6, additional details of the mounting base 125 are shown. In particular, closure detent 127 is formed by an upstanding member from the generally planar lower surface of base 125. The closure detent 127 (presently shown as an ellipse, but also capable of taking on other geometric shapes, including tapered shapes) is configured to form a frictional fit with dispenser discharge aperture 170 and discharge compartment discharge aperture 145 (when the two apertures are aligned in the aforementioned second actuation position, as shown in FIG. 4) to inhibit any residual fluent material in the discharge compartment 130 from inadvertently getting knocked loose and spilling to the ambient environment. In the event a small fraction of fluent material escapes past closure detent 127, the trough-like nature of the mounting base construction is such that the fluent material will be confined to the base, which can then be easily cleaned up. Circumferential lip 126 extends around the top periphery of the mounting base 125 to promote a tight, secure fit with dispenser 100 via channel 142. Preferably (although not necessarily), the engagement between lip 126 and channel 142 is a snap-fit. As previously mentioned, the material making up mounting base 125 and closure detent 127 can be made to be relatively compliant to facilitate a better seal between the detent 127, discharge compartment discharge aperture 145 and dispenser discharge aperture 170 (as shown in FIG. 5) when the dispenser is in its second actuation position. By having a frictional fit, the closure detent 127 can conform to the shape of discharge compartment discharge aperture 145 and dispenser discharge aperture 170, thereby effecting an improved seal. Mounting base 125, dispenser discharge aperture 170 and discharge compartment discharge aperture 145 are all sized such that the mounting base 125 can engage dispenser 100 in either the first (fill) actuation position of FIGS. 1 through 3, or the second (dispense) actuation position shown in both FIGS. 4 and 7, the latter of which is described below.

Figure 7:
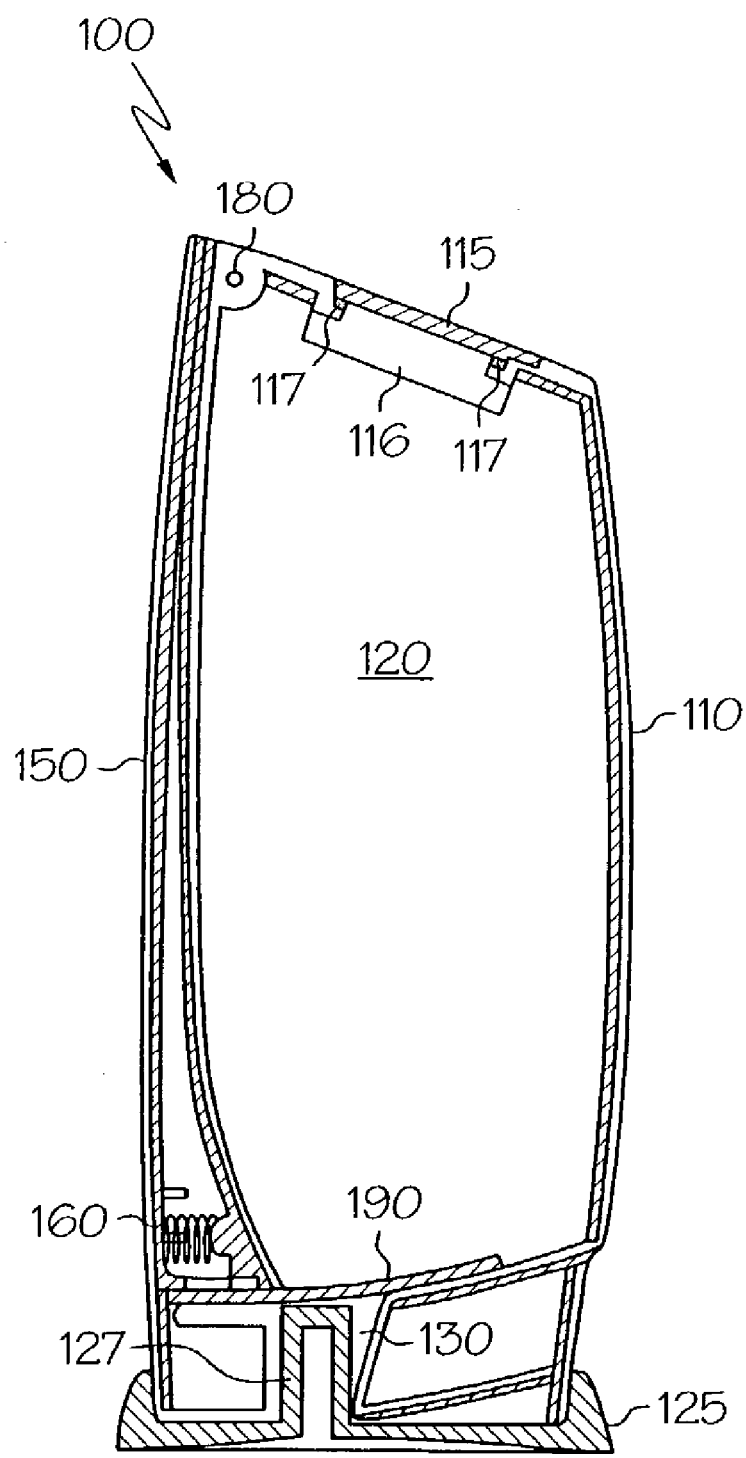
FIG. 7 illustrates a cutaway view of the dispenser of FIG. 1 engaged with the mounting base of FIG. 6 such that the dispenser is in a stored position.

Referring next to FIG. 7, features of construction details of the first embodiment of the dispenser 100 are shown in a cutaway view. In the present figure, the reservoir 110 is in its second, actuated position relative to actuation mechanism 150 such that once the fluent material 122 (not presently shown) is dispensed, and before allowing the reservoir 110 and the actuation mechanism 150 to return to their respective first, non-actuated positions under the influence of (now-compressed) spring 160, the mounting base 125 is brought into engagement with the respective complementary surfaces of the dispenser 100. Particularly, closure detent 127 passes up through dispenser discharge aperture 170 and discharge compartment discharge aperture 145 (the two apertures being aligned in the second actuation position) and into discharge compartment 130 to form a relatively tight, substantially leak-free plug in the apertured lower surface of dispenser 100, while lip 126 (shown in FIG. 6) peripherally engages corresponding channel 142 (shown in FIG. 5) to form a locking arrangement. The trough-like construction of mounting base 125 ensures that any residual fluent material 122 that does escape past closure detent 127 collects in the mounting base 125, thereby preventing spillage onto a surface upon which the dispenser 100 is placed, such as a shelf, countertop or table.

Figure 8A:
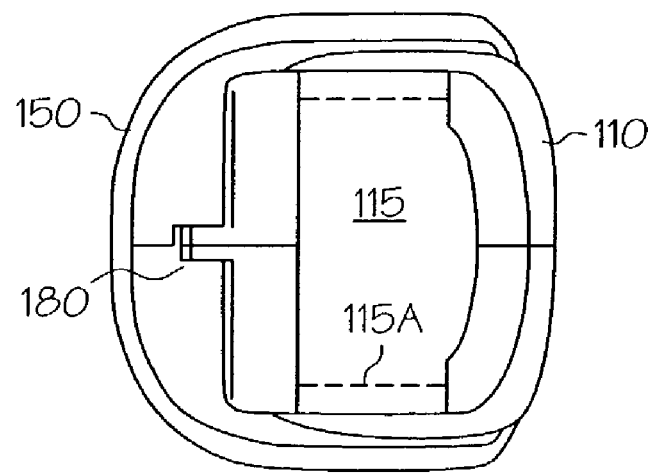
FIG. 8A illustrates a top view of the cover and how it sealingly engages the dispenser of FIG. 1.
Figure 8B:
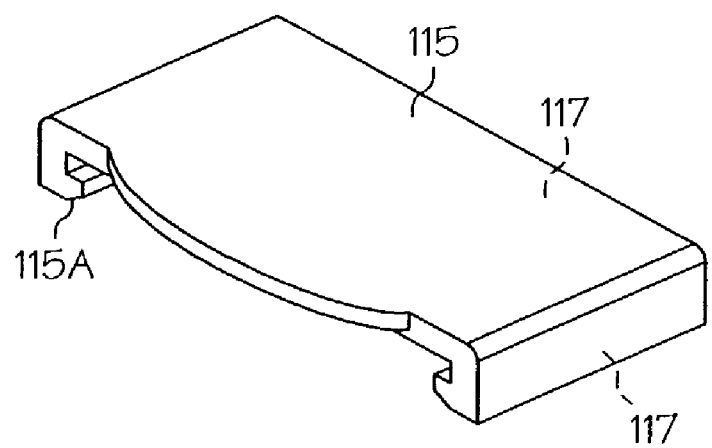
FIG. 8B illustrates a perspective view of the cover, highlighting its reservoir-engaging detents.

Referring next to FIGS. 8A and 8B, features of the cover 115 and its ability to form a permanent, sealing engagement with dispenser 100 are shown. In FIG. 8A, cover 115 is shown in its engaged position relative to reservoir 110 such that storage compartment 120 (shown in FIG. 2) is substantially inaccessible from the external ambient environment. Cover 115 includes detents 115A that interlock with slots 116A (shown in FIG. 2) formed adjacent aperture 116. Preferably, the fit between cover 115 and reservoir 110 is such that, once the fluent material 122 is placed in storage compartment 120 of dispenser 100, and cover 115 is placed in aperture 116 with detents 115A interlocked with slots 116A, the connection between the reservoir 110 and the cover 115 is permanent, so that the fluent material 122 is sealed inside dispenser 100. As shown with particularity in FIG. 8B, sealant material 117 can be disposed on one or more of the lower surfaces of cover 115 such that when cover 115 is secured to the top of reservoir 110 (shown in FIG. 8A), a sealing relationship between the two is promoted.

Figure 8C:
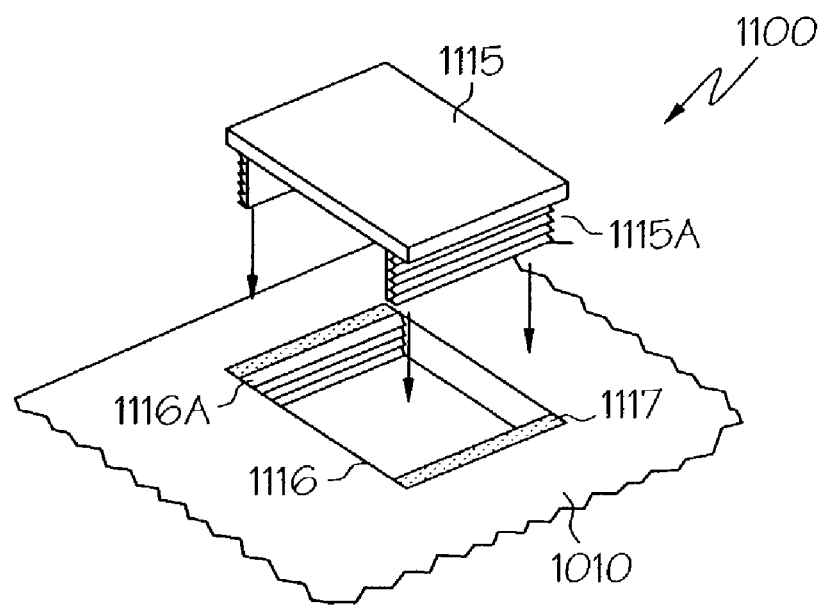
FIG. 8C illustrates a perspective view of an alternate embodiment of the cover and reservoir-engaging members.
Figure 8D:
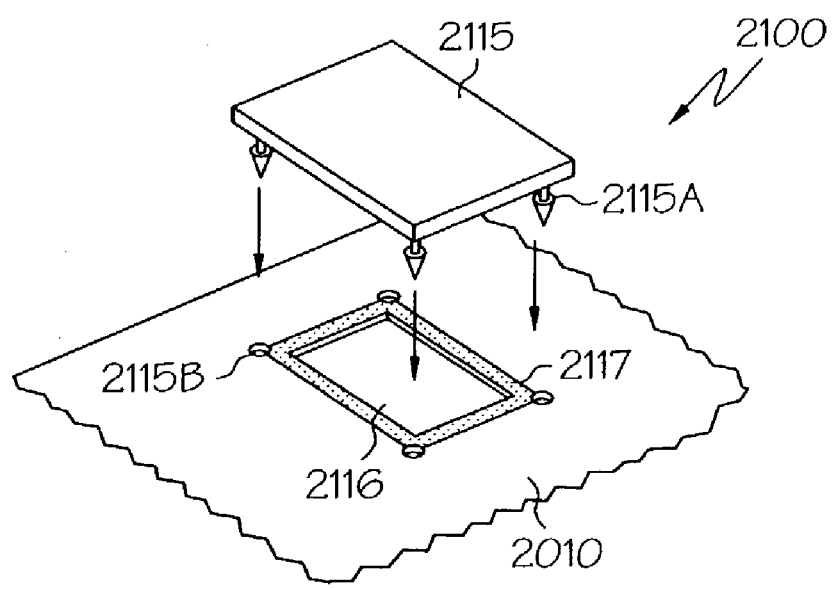
FIG. 8D illustrates a perspective view of yet another alternate embodiment of the cover and its reservoir-engaging detents, as well as the placement of a sealant material on a part of the surface of the reservoir.

Referring next to FIGS. 8C and 8D, alternate versions of the cover 1115 and 2115, respectively are shown. In the first variant, shown with particularity in FIG. 8C, the cover 1115 and corresponding surface within the reservoir 1010 each include interlocking teeth 1115A that form a snap-fit locking connection. In addition (as with the previous aspects), sealant material 1117 and 2117 respectively can be placed between the dispenser 1100, 2100 and the cover 1115, 2115 respectively to effect enhanced air and moisture sealing. The cover 1115 can be made to either rest on top of reservoir 1010 (as shown), or to fit within a recess in the upper surface of reservoir 1010, while either can be made to be compatible with the aforementioned sealant material 1117. Referring with particularity to FIG. 8D, inverted conical connectors 2115A can be snap-fit into openings 2115B disposed in the upper surface of reservoir 2010 to join the cover 2115 to dispenser 2100. It will be appreciated that either of these cover configurations may offer an alternative to the cover 115 shown in FIG. 1. As with the version shown in FIG. 8C, cover 2115 can be either surface-mounted or flush-mounted.

Figure 9:
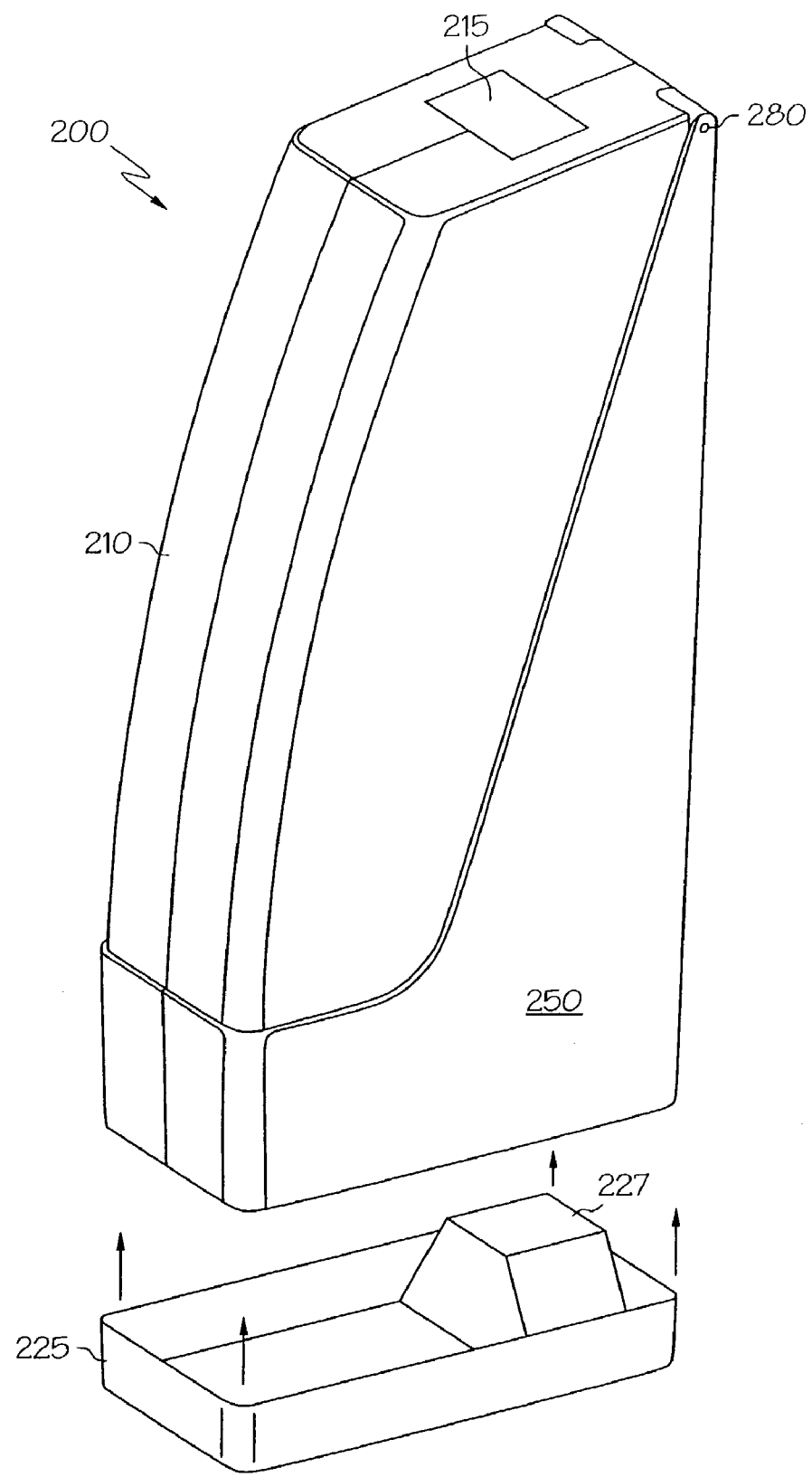
FIG. 9 illustrates a perspective view of an alternate embodiment of the present dispenser.
Figure 10:
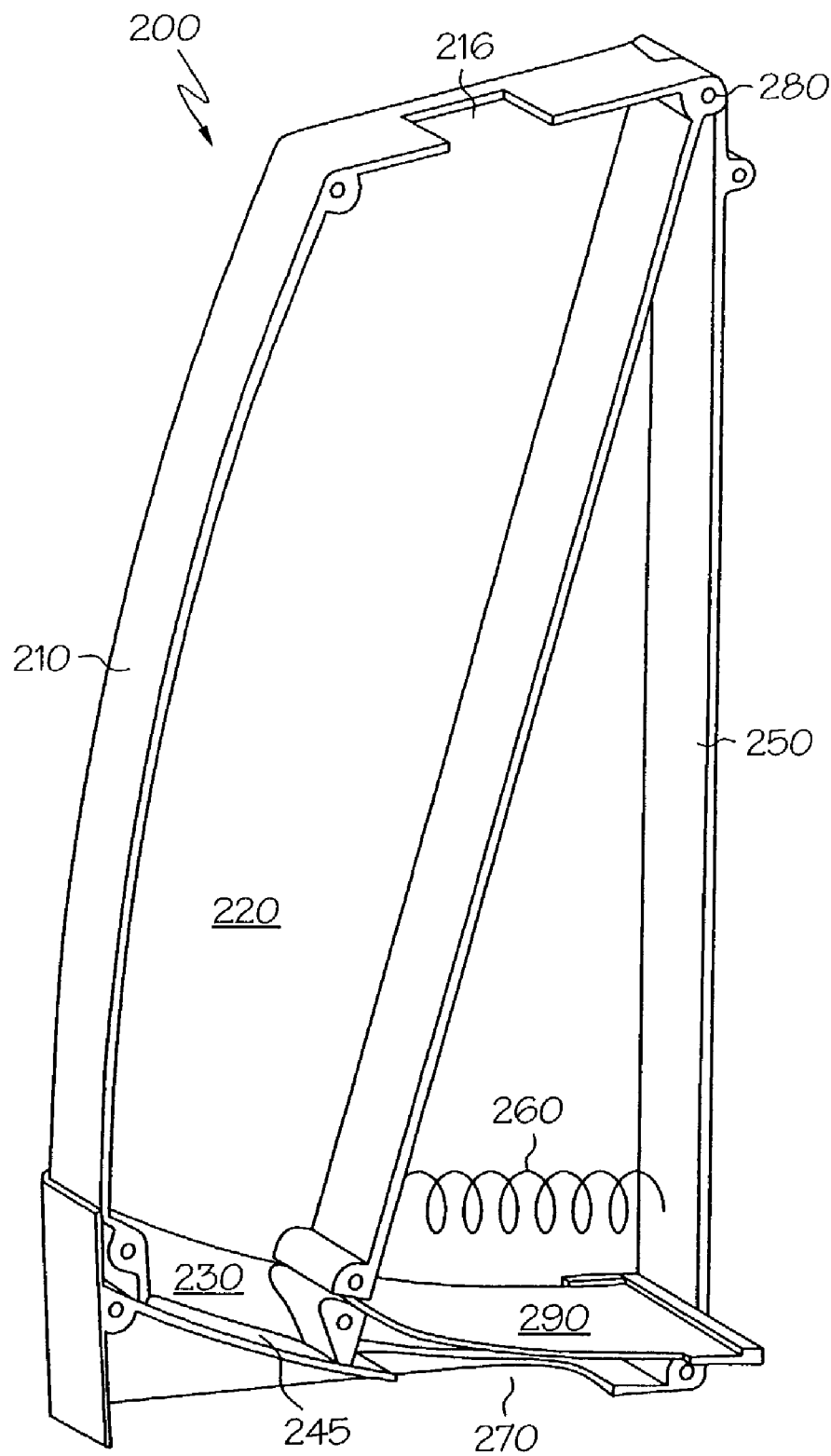
FIG. 10 illustrates a cutaway view of the dispenser of FIG. 9 in a first, non-actuated position.
Figure 11:
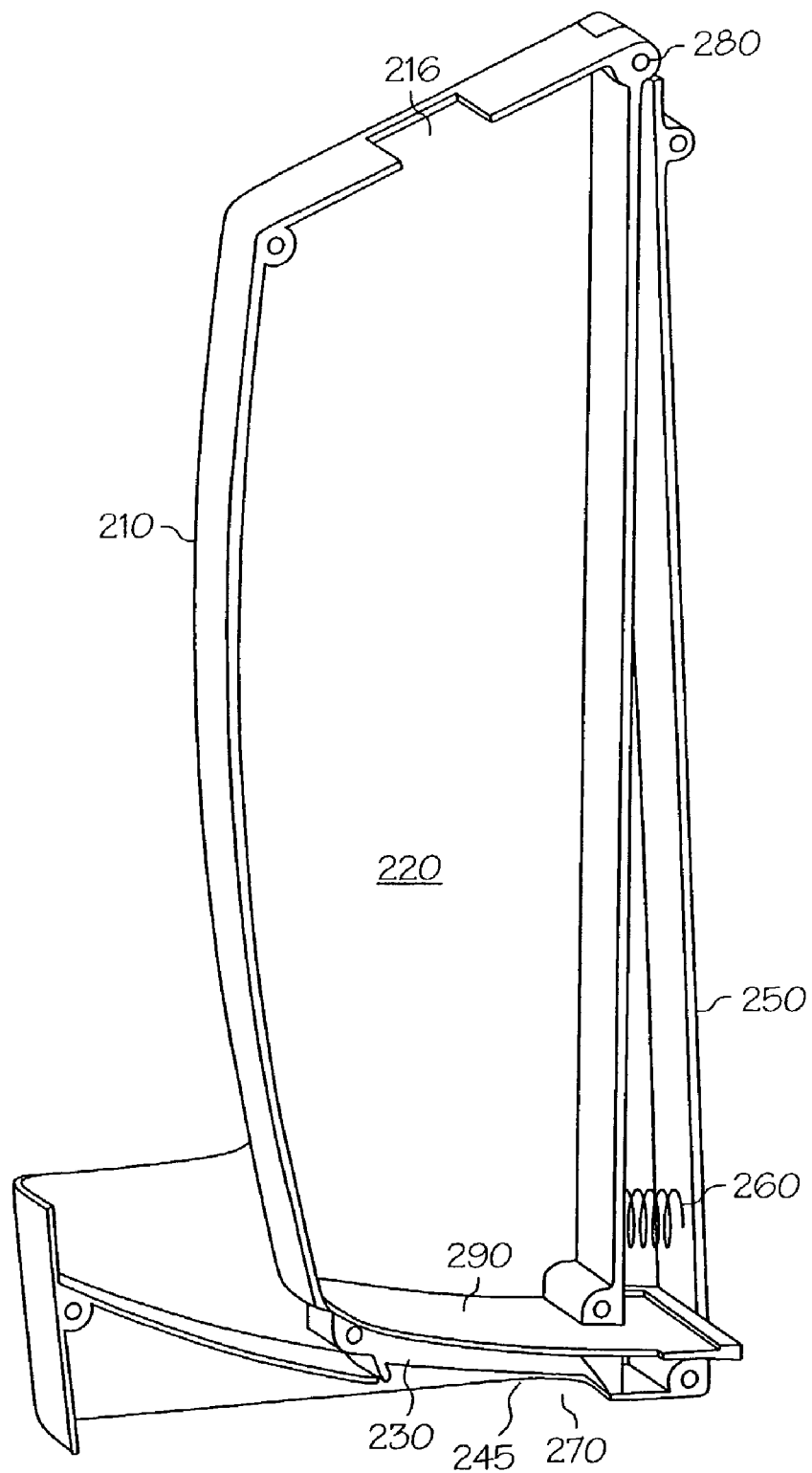
FIG. 11 illustrates a cutaway view of the second embodiment of the present invention dispenser in a second, as-actuated position.

Similar system attributes can be found in the alternate embodiment of the present invention, which are illustrated in FIGS. 9–17B. Referring with particularity to FIG. 9, a second embodiment of the present invention is shown. Dispenser 200 includes a reservoir 210 hingedly connected to actuation mechanism 250 at hinge 280. Cover 215 can be used to effect a sealed closure to reservoir 220 in a manner similar to that previously discussed. Unlike the first embodiment, when the dispenser 200 is in its first actuation position, the outer dimension defined by the reservoir 210 and the actuation mechanism 250 presents a relatively smooth, continuous surface. This can be beneficial, as the reduced amount of surface undulation facilitates ease of dispenser packaging and stacking. Mounting base 225 can be engaged with dispenser 200 such that closure detent 227 formed in the mounting base 225 can block off dispenser discharge aperture 270, thereby substantially sealing any fluent material contained within dispenser 200 from the ambient environment. As shown in the cutaway view of FIGS. 10 and 11, reservoir 210 includes a storage compartment 220 with the bottom thereof selectively terminating in a discharge compartment 230 with discharge compartment discharge aperture 245. Aperture 216 in the upper surface of reservoir 210 allows fluent material to be poured into dispenser 200, while sealant material (not presently shown) can be used to enhance sealing between the dispenser 200 and the cover 215. Actuation mechanism 250 houses spring 260 and flow cutoff member 290 the latter of which fluidly separates storage compartment 220 from discharge compartment 230 when the dispenser 200 is squeezed into its dispense position. When dispenser 200 is placed into dispense position, shown with particularity in FIG. 11, discharge aperture 245 at the bottom of discharge compartment 230 comes into face-to-face (i.e., aligned) engagement with dispenser discharge aperture 270 so that the fluent material in discharge compartment 230 is placed in fluid communication with the ambient environment.

Figure 12:
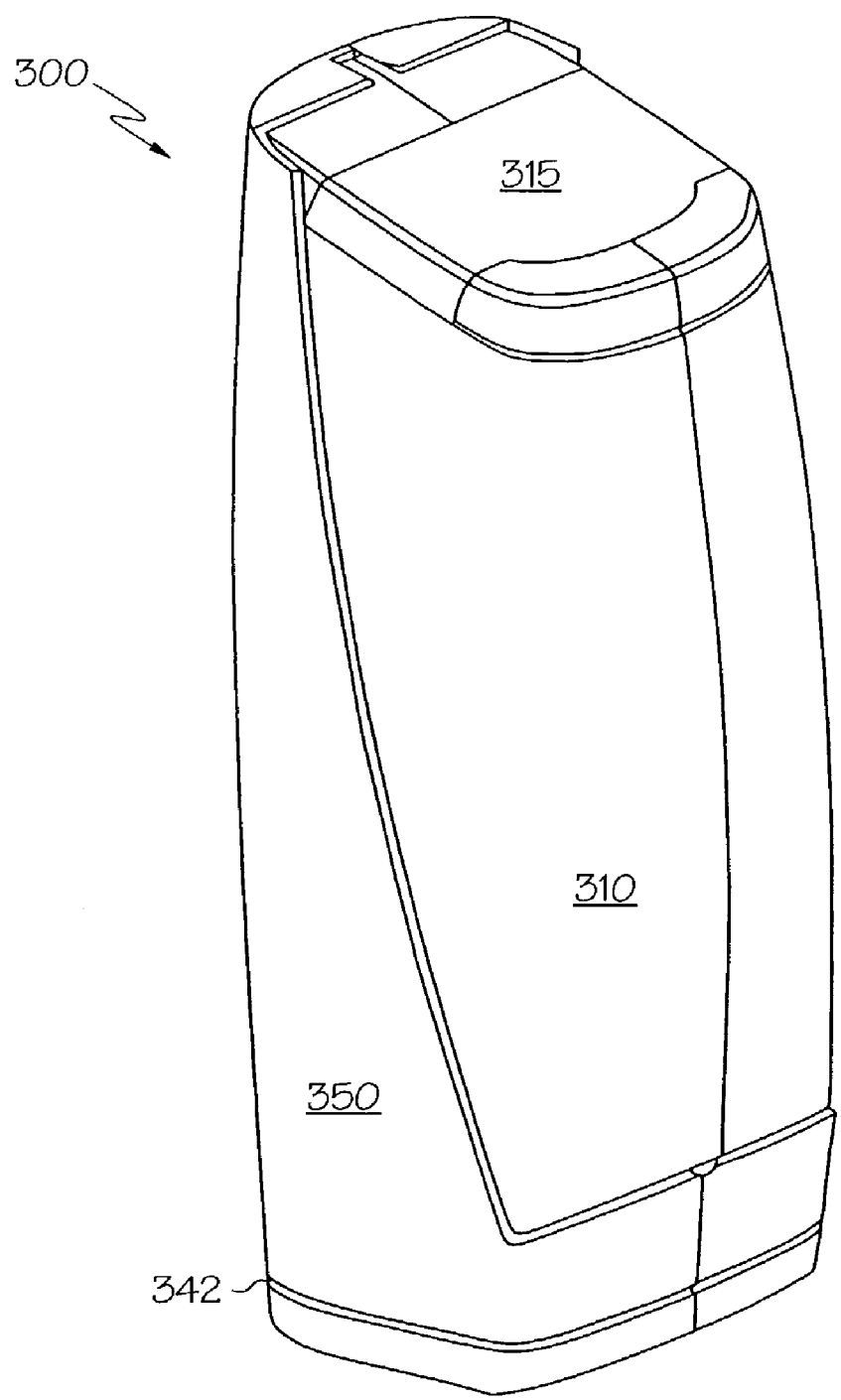
FIG. 12 illustrates a perspective view of a third embodiment of the dispenser of the present invention in a first, non-actuated position.
Figure 13:
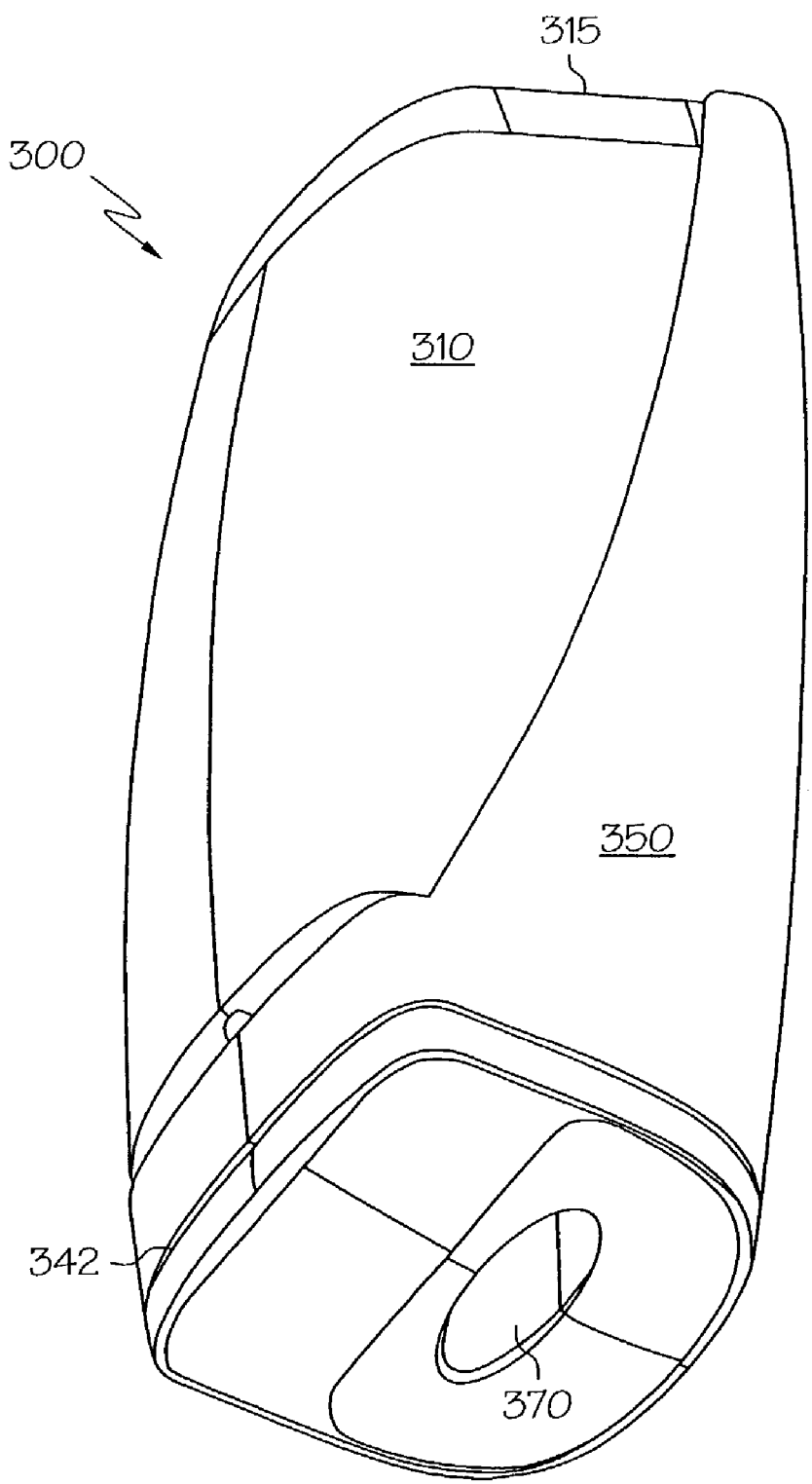
FIG. 13 illustrates an alternative perspective view of the dispenser of FIG. 12 in a first, non-actuated position, highlighting the enclosure discharge aperture.

FIGS. 12 and 13 show another embodiment of the present invention, with dispenser 300 including reservoir 310 and actuation mechanism 350, with cover 315 and dispenser discharge aperture 370. Here, shown with particularity in FIG. 13, the reservoir 310 projects beyond the actuation mechanism 350 more than the embodiment of FIG. 9, but less than that of FIG. 1. As before, channel 342 defines a notched surface around the periphery of actuation mechanism 350, and can be used to engage a mounting base (not presently shown) substantially similar to mounting base 125 of FIG. 6. Also, as with the previous embodiments, the alternative cover configurations depicted in FIGS. 8C and 8D can be employed in dispenser 300.

Figure 14B:
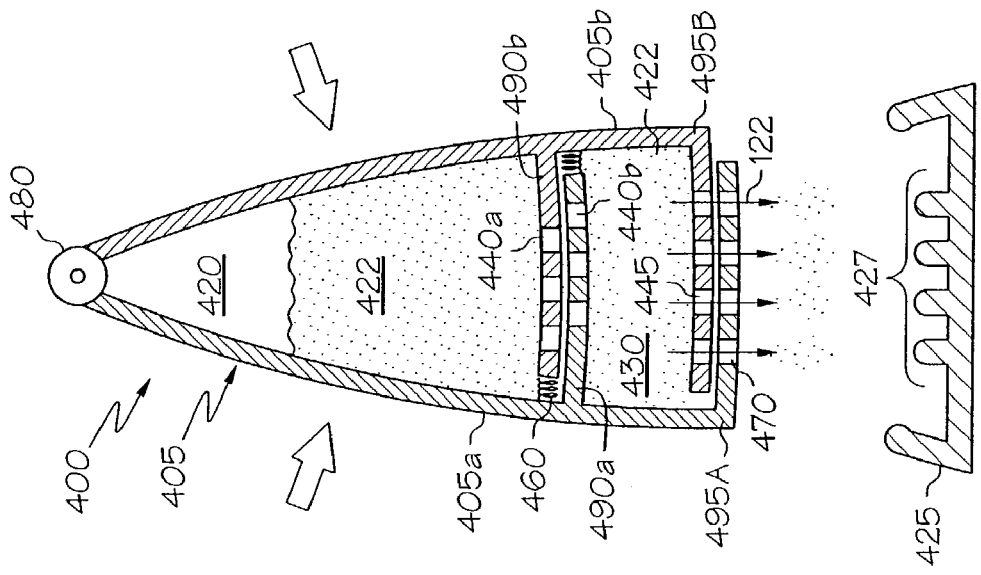
FIG. 14B illustrates the fourth embodiment of the dispenser of the present invention in a second, dispensing position.
Figure 14A:
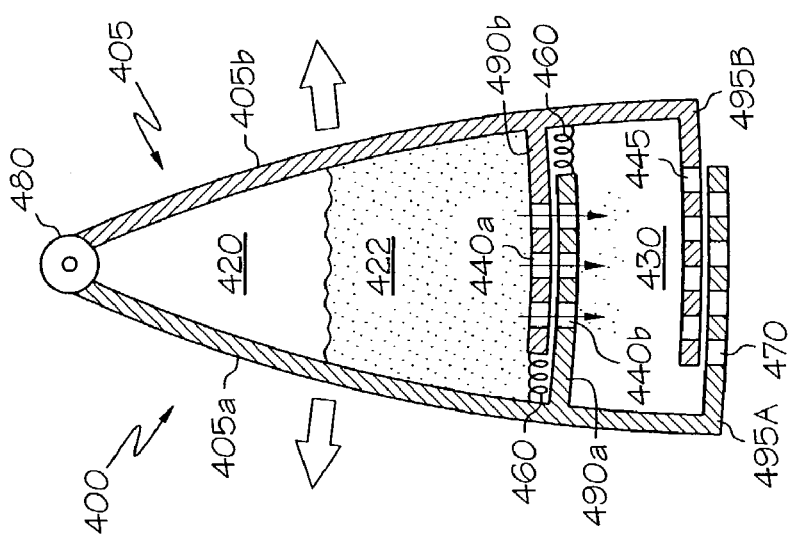
FIG. 14A illustrates a perspective view of a fourth embodiment of the dispenser of the present invention in a first, fill position, highlighting the enclosure discharge aperture.

FIGS. 14A and 14B show another embodiment of the present invention, with dispenser 400 in the fill position in FIG. 14A, and the dispense position in FIG. 14B. In this embodiment, the reservoir and actuation mechanism are combined into a single housing 405 as connected halves 405A and 405B that between them define storage compartment 420 and discharge compartment 430 to hold and discharge respectively fluent material 422. Hinge 480 permits pivotal movement between halves 405A and 405B. Fluid communication between storage compartment 420 and discharge compartment 430 is effected by a plurality of selectively cooperating storage compartment discharge apertures 440A and 440B, either or both of which can be defined by a set of smaller apertures (shown in the figures) or a single large aperture. In either configuration, the storage compartment discharge apertures 440A and 440B are aligned in FIG. 14A to define a flowpath between the storage compartment 420 and the discharge compartment 430. Storage compartment discharge apertures 440A and 440B are formed in flow cutoff members 490A and 490B, respectively, that are each formed into or otherwise attached to corresponding halves 405A and 405B. Similarly, discharge compartment discharge aperture 445 is formed into a lower surface of housing half 405B to establish selective fluid communication with discharge aperture 470 located in a lower surface of housing half 405A. As with the storage compartment 420, the apertures 445, 470 in discharge compartment 430 can be formed in first and second cutoff members 495A and 495B. The relative alignment or misalignment of the discharge apertures 445, 470 is opposite of that of storage compartment discharge apertures 440A and 440B. Thus, when the dispenser 400 is in the dispense position shown in FIG. 14B, the storage compartment discharge apertures 440A and 440B are misaligned such that the storage compartment 420 is cut off from the discharge compartment 430, while discharge compartment 430 is opened to the ambient environment such that fluent material 422 can be gravity fed from storage compartment 430 through discharge compartment discharge aperture 445 and dispenser discharge aperture 470. As with the previous embodiments, one or more springs or similar bias mechanism 460 can be used to bias the dispenser 400 to the fill position shown in FIG. 14A. A protruding member on dispenser half 405A defines a generally upward-facing planar surface with aperture 416 into which cover 415 can be placed, thereby providing both an opening for inputting fluent material 422 and a way to seal storage compartment 420 once the fluent material has been placed inside. The protruding member can be ergonomically shaped such that a user's hand can grasp dispenser 400 comfortably. Mounting base 425, which functions in a manner similar to that previously described, is shown beneath dispenser 400 in the dispenser's second (dispense) position. Multiple closure detents 427 can be employed to accommodate each of the dispenser discharge apertures 470 to provide both a secure fit between the dispenser and base 425, as well as improved sealing of the discharge compartment discharge aperture 445 and dispenser discharge aperture 470.

Figure 15C:
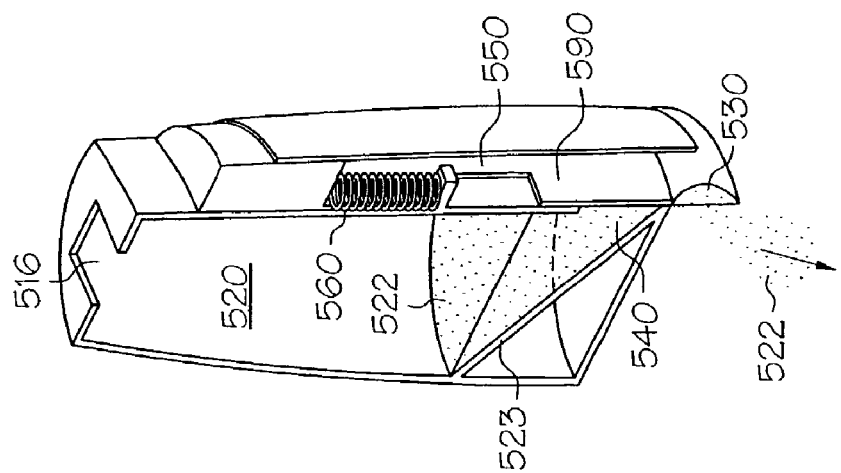
FIG. 15C is a cutaway of the fifth embodiment of the dispenser in its second, dispensing position.
Figure 15B:
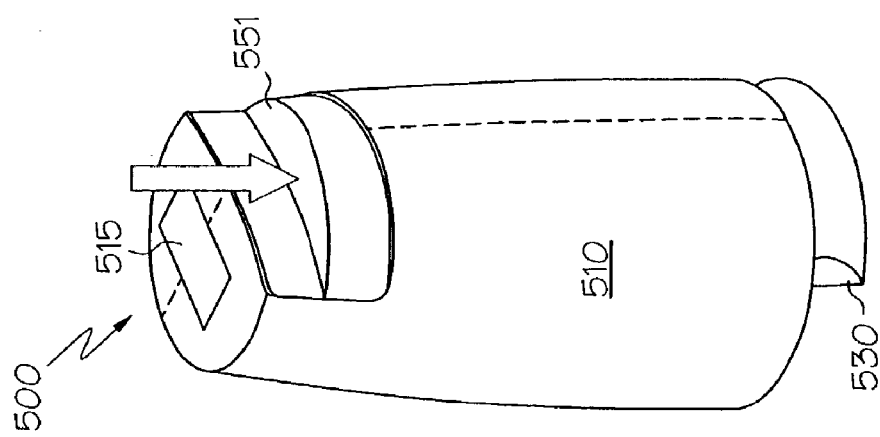
FIG. 15B illustrates the fifth embodiment of the dispenser of the present invention in a second, dispensing position.
Figure 15A:
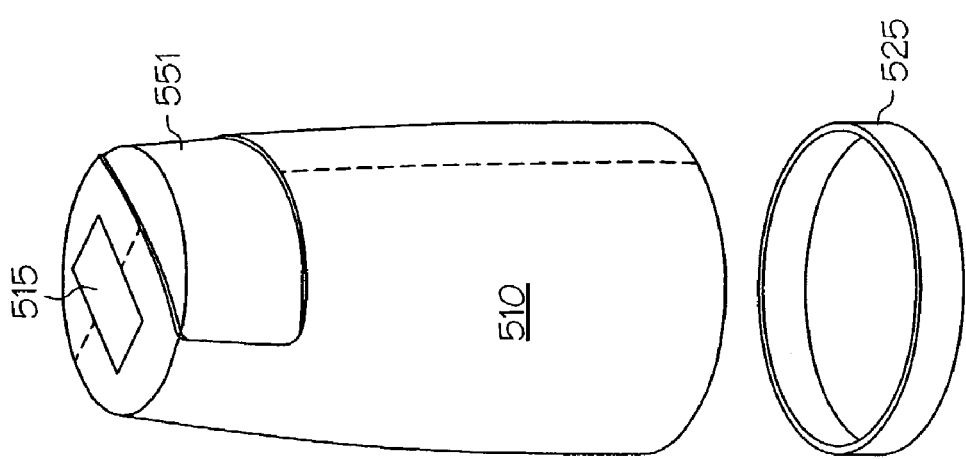
FIG. 15A illustrates a view of a fifth embodiment of the dispenser of the present invention in a first, fill position.

FIGS. 15A–15C show another embodiment of the present invention, with dispenser 500 in the fill position in FIG. 15A, and the dispense position in FIG. 15B. Rather than using a pinned or hinged connection between the reservoir and actuation mechanism (as depicted in the previous embodiments), the present embodiment is configured such that the two can move axially relative to one another. Reservoir 510 together with actuation mechanism 550 define a housing that contains fluent material 522 in storage compartment 520. A sloped feed plane 523 can be formed in storage compartment 520 to facilitate the gravity feeding of fluent material 522 to discharge compartment 530. Cover 515 can fit within the upward-facing top surface of dispenser 500, and is similar to those previously described. Discharge compartment 530 is formed in actuation mechanism 550 such that when a protruding tongue 551 mounted thereon is depressed, it overcomes a spring 560 bias to force actuation mechanism 550 to move relative to reservoir 510, which in turn permits discharge compartment 530 to eject fluent material 522 contained therein. While in a first actuation position (shown in FIG. 15A), the bottom surface 515 of dispenser 500 is generally planar, as the lowermost portion of discharge compartment 530 does not protrude below. In the second actuation position (shown in FIG. 15B with the arrow showing the direction of the applied actuation force), the discharge compartment 530, being connected to actuation mechanism 550, extends below the bottom surface 515 during the relative axial movement. Flow cutoff member 590 is integrally formed into actuation mechanism 550 to temporarily halt the flow of fluent material 522 between storage compartment 520 and discharge compartment 530. Storage compartment discharge aperture 540 is defined in a lower end of reservoir 510, while a ramp 595 can be used to gravity assist the feed of the fluent material 522 into discharge compartment 530. Similarly, protruding tongue 551 can be configured such that it sticks vertically upward such that its upper surface is not coplanar with the remainder of the top of dispenser 500 during its first (fill) position. Mounting base 525, as with the previous versions, generally conforms to the shape of the bottom of dispenser 500. In the present aspect of the invention, a protruding detent is not required in the mounting base 525, as the crescent-shaped discharge compartment 530 is prevented from being inadvertently deployed due to the presence of the trough of mounting base 525. Mounting base 525 can include a circumferential lip about its upper surface to engage with a channel (not shown, but similar to channel 142 shown in FIGS. 3 through 5) on the dispenser 500. In another variation (also not shown), the axisymmetric nature of both the mounting base 525 and the lower portion of the dispenser 500 allow them to incorporate complementary threads that can engage one another, thereby enhanced the level of connectivity between them.

Figure 16B:
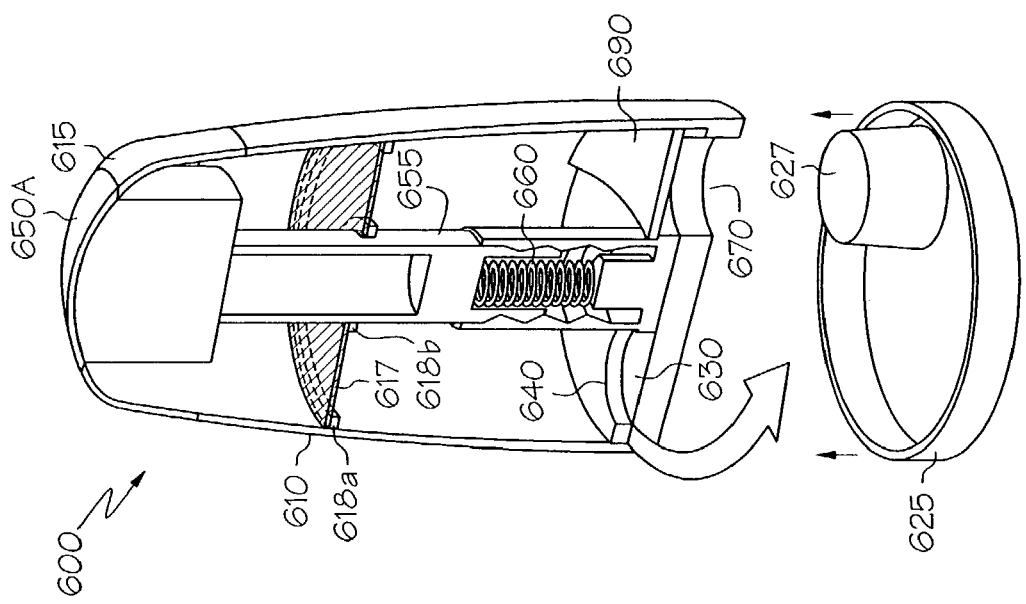
FIG. 16B illustrates a cutaway view of the dispenser of FIG. 16A.
Figure 16A:
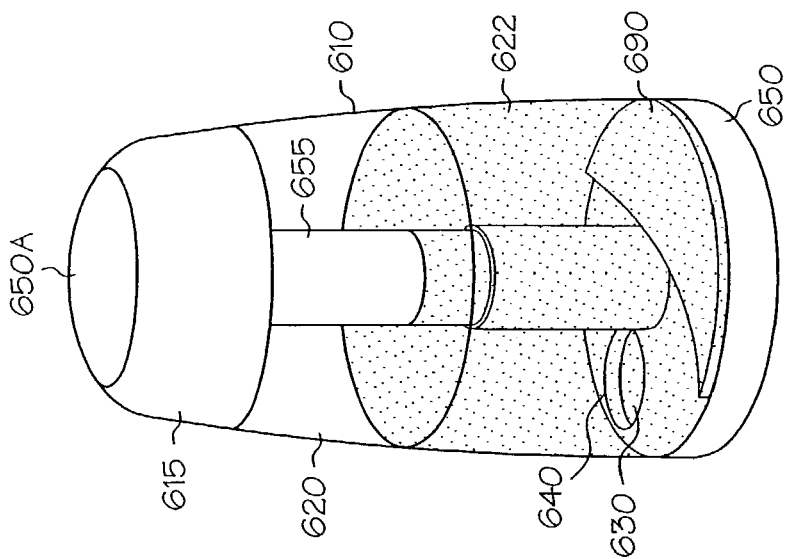
FIG. 16A illustrates a view of a sixth embodiment of the present invention in a first, non-actuated position.

FIGS. 16A and 16B show another embodiment of the present invention, with dispenser 600. In this embodiment, reservoir 610 includes storage compartment 620, which in turn holds fluent material 622. Cover 615 connects to the top of reservoir 610 to prevent access to the fluent material 622 inside after the fluent material has been poured into the dispenser 600. In one form, cover 615 can be screwed onto housing 655 such that a locking thread connection is formed, thus preventing the cover 615 from being subsequently unscrewed. In another variation, cover 615 can be snap-fit onto the dispenser 600. A plurality of discharge compartments 630 (shown notionally as two in number in the figure) make up an upper surface of actuation mechanism 650 that is disposed relative reservoir 610 to define the bottom of storage compartment 620. The upper part of actuation mechanism 650 is in the form of a button 650A formed in the middle of cover 615. By depressing button 650A relative to cover 615, housing 655 moves downward, causing spring 660 to compress. Threads in the lower portion of housing 655 cause it (as well as attached storage compartment discharge aperture 640) to rotate. As such, actuation mechanism 650 is rotatably connected to reservoir 610 such that upon relative twisting between the two (due to depressing button 650A as described above), one of the discharge compartments 630 will enter into fluid communication with a dispenser discharge aperture 670 located on the lower surface of actuation mechanism 650, thus permitting fluent material 622 to be gravity fed onto a desired area below. Storage compartment discharge aperture 640 permits continuous fluid communication between storage compartment 620 and discharge compartment 630 such that in the fill position of dispenser 600, all of the discharge compartments 630 are substantially filled with fluent material 622. An engaging notch (not shown) similar to that shown in the previous embodiments may be included to help secure the dispenser 600 to an object into which the fluent material 622 is to be dispensed. Spring 660 biases dispenser 600 to a fill position to ensure that a continuous flowpath from the storage compartment 620 in reservoir 610 through discharge compartment 630 and dispenser discharge aperture 670 is not maintained once a metered amount of fluent material 622 is dispensed. The benefit of dispenser 600 with purely rotational motion of two concentrically-mounted axisymmetric bodies, as compared to the purely translational movement of dispenser 500 or the pivoted movement of dispensers 100, 200, 300 or 400 shown previously, is that the external dimension of the device does not change, regardless of what actuation position it is in. This can ensure that the footprint of dispenser 600 remains small, improving storability and packaging. Mounting base 625 can be shaped to fit beneath dispenser 600 such that, upon actuation of the dispenser 600 into its second (discharge) position, closure detent 627 on mounting base 625 can be placed within the aligned openings defined by discharge compartment 630 and dispenser discharge aperture 670 to lock the dispenser 600 in its second position. Sealing membrane 617 may be disposed in the upper portion of reservoir 610 such that after the fluent material 622 is loaded (but prior to placement of cover 615), sealing membrane 617 can be affixed to enhance dispenser 600 sealing. Note that sealing membrane 617 should not be placed so close to the top of reservoir 610 such that it interferes with the upward and downward motion of button 650A. Ledges 618A, 618B can be disposed circumferentially along the interior wall of reservoir 610 and the outer wall of housing 655, respectively. These ledges (which can be integrally formed into the dispenser 600) can provide a secure sealing location for attachment of the sealing membrane 617. The sealing membrane 617 can be configured to have a limited aperture therein to allow passage of the housing 655 that contains bias spring 660 of actuation mechanism 650. Sealing membrane 617 can be affixed to either the cover 615 or reservoir 610 through a conventional adhesive, or can be formed from a rigid or semi-rigid disk (with or without a layer of compliant material, such as the aforementioned sealant material) that can be adhered to, welded to (ultrasonically or otherwise) or frictionally disposed between the cover 615 and reservoir 610. Sealing membrane 617 can be made from any suitable material, including plastic, aluminum foil or any of the materials previously discussed earlier in relation to sealant material 117.

Figure 17A:
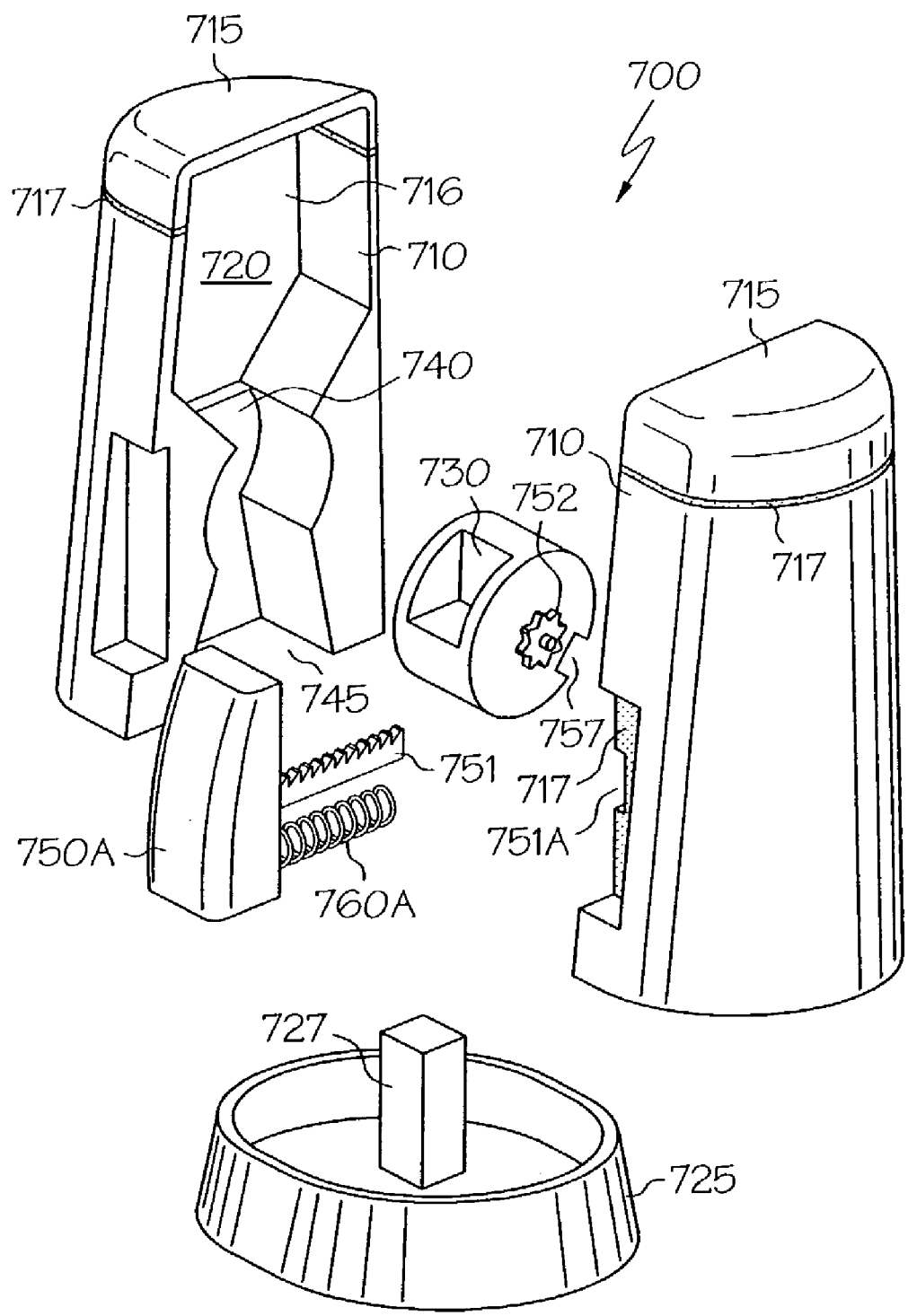
FIG. 17A illustrates a seventh embodiment of the present invention.
Figure 17B:
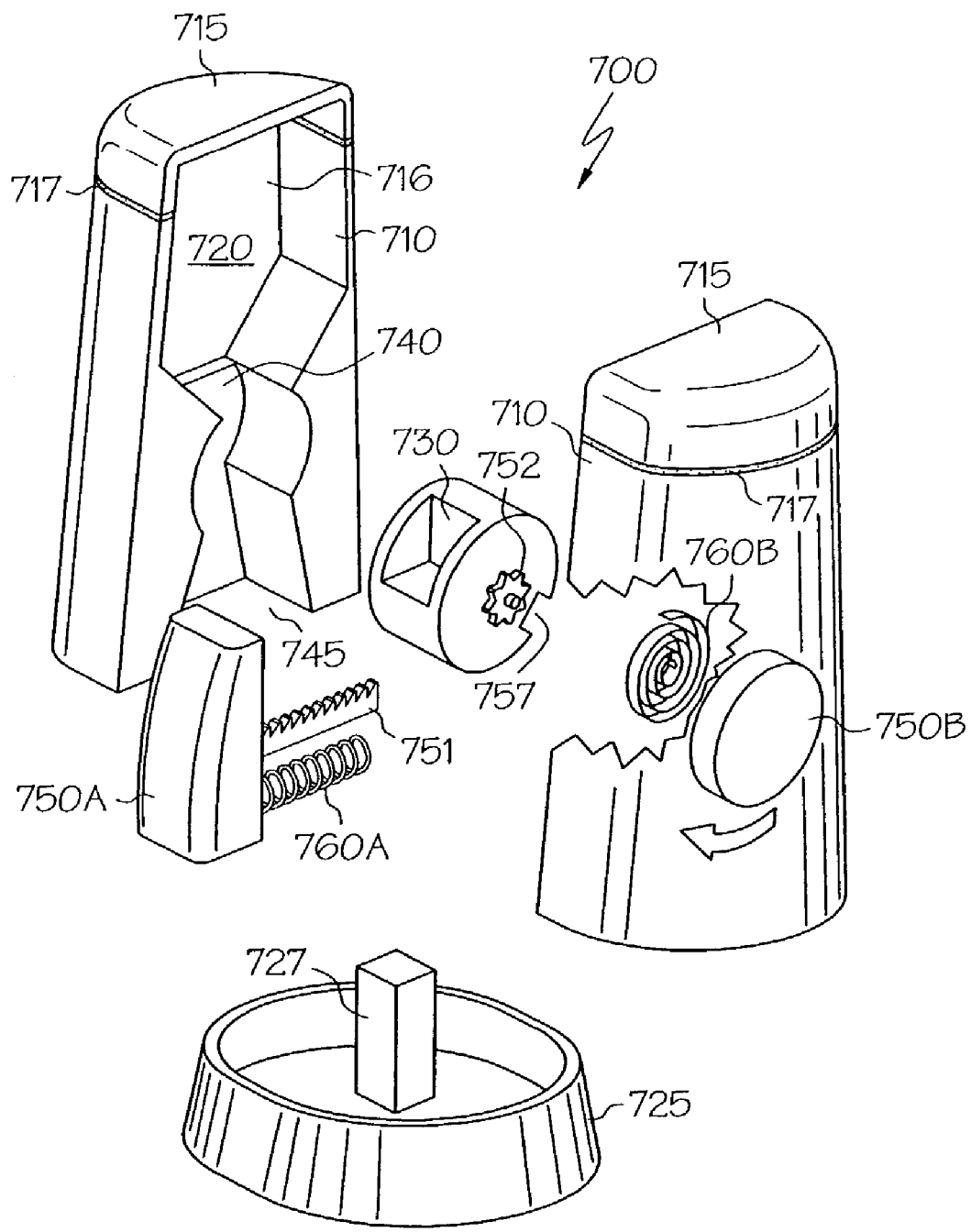
FIG. 17B illustrates a variation on the seventh embodiment of FIG. 17A with a side-mounted dial as an actuation mechanism.

Referring next to FIGS. 17A and 17B, another embodiment of the present invention is shown. In this embodiment, dispenser 700 includes a reservoir 710 with a storage compartment 720, which in turn holds fluent material 722. Cover 715 connects to the top of reservoir 710 to prevent access to the fluent material 722 inside after the fluent material has been poured into the dispenser 700. As previously mentioned, the connection between the cover 715 and the top of dispenser 700 is preferably permanent, and can also be achieved by one or more of the cover configurations previously shown. Sealant material 717 can be placed between cover 715 and reservoir 710, as well as adjacent an opening 718 in the housing that allows a toothed rack 751 to pass therethrough. Although not presently shown, a sealing membrane can be placed across the aperture 716 defined in the top of reservoir 710 prior to connecting the cover 715.

The enhanced sealing made possible by the sealing membrane can be used in conjunction with, or in lieu of sealant material 717. As before, mounting base 725 can be formed from a generally compliant material such that the lower portion of dispenser 700 can fit snugly within the mounting base 725 to improve sealing. Closure detent 727 can be integrally formed into mounting base 725 and project upward to engage a cutout 757 formed in discharge compartment 730, thereby preventing inadvertent dispensing of fluent material when the mounting base 725 is connected to dispenser 700. Referring with particularity to FIG. 17A, actuation mechanism 750, which includes biased articulating member (spring) 760A, actuator 750A and toothed rack 751, is configured engage pinion gear 752 disposed on the side of discharge compartment 730 (which is in the shape of a rotatable drum) such that upon linear pushing motion from a user on actuator 750A, toothed rack 751 causes the pinion gear 752 to spin; rigid coupling between the pinion gear 752 and the rotatable drum holding discharge compartment 730 in turn causes discharge compartment 730 to be in selective fluid communication with reservoir 720 and discharge compartment discharge aperture 745, respectively. Biased articulating member 760A ensures that once the fluent material (not presently shown) has been dispensed from the rotatable drum holding discharge compartment 730, the actuator 750A returns to its biased position. Referring with particularity to FIG. 17B, actuator 750B is a knob that can be turned (for example, in a clockwise direction) to rotate discharge compartment 730. Articulating member (spring) 760A is now in the form of an involute (similar to a watch spring) such that it biases the dispenser to a first (fill) position. The mounting base 725 is configured similar to that of FIG. 17A to affect a locking relationship to prevent discharge of fluent material when the mounting base 725 is connected to the dispenser 700.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A disposable dispenser comprising:
 a reservoir configured to sealingly contain a fluent material therein, said reservoir comprising:
  a storage compartment; and
  a discharge compartment in selective fluid communication with said storage compartment;
 an actuation mechanism operatively coupled to said reservoir, said actuation mechanism comprising a biased articulating member such that together said reservoir and said actuation mechanism are configured such that in a first actuation position said storage compartment is in fluid communication with said discharge compartment to effect a filling thereof, and in a second actuation position said discharge compartment is in fluid communication with an ambient environment to permit said fluent material to be discharged thereto; and
 a detachable mounting base configured to engage a lower surface of said dispenser, wherein said mounting base comprises a closure detent on an upper surface thereof, said closure detent configured such that upon its insertion into said discharge compartment after at least a substantial majority of said fluent material has been discharged therefrom, said dispenser is locked into said second actuation position.

2. A dispenser according to claim 1, wherein said dispenser is of predominantly plastic construction.

3. A dispenser according to claim 2, wherein at least a portion of said predominantly plastic construction comprises transparent plastic.

4. A dispenser according to claim 3, further comprising an optical treatment on at least a portion of said transparent plastic.

5. A dispenser according to claim 4, wherein said optical treatment is a low-emissivity coating.

6. A dispenser according to claim 1, wherein said reservoir defines a fill aperture therein, said dispenser further comprising a cover configured to engage said reservoir such that once said fluent material has been placed within said reservoir, said cover effects permanent closure of said aperture.

7. A dispenser according to claim 6, wherein at least one of said cover or said reservoir further comprises a layer of sealant material disposed on a surface thereof.

8. A dispenser according to claim 6, further comprising a sealing membrane disposed between said cover and said reservoir.

9. A dispenser according to claim 6, wherein said cover and said reservoir comprise complementary connectors such that said cover can form a snap-fit engagement with said reservoir.

10. A dispenser according to claim 6, wherein said cover and said reservoir comprise complementary connectors such that said cover can form a locking threaded engagement with said reservoir.

11. A dispenser according to claim 1, wherein said selective fluid communication between said storage compartment and said discharge compartment is by gravity-feed.

12. A dispenser according to claim 1, wherein said engagement between said closure detent and said discharge compartment forms a frictional fit.

13. A dispenser according to claim 1, wherein the material making up said closure detent is compliant relative to the material making up said discharge compartment such that a substantial seal is formed between said closure detent and said discharge compartment.

14. A dispenser according to claim 1, wherein said mounting base comprises a trough-like lower surface that is configured to contain excess of said fluent material.

15. A dispenser according to claim 1, wherein said discharge compartment is defined by a predetermined volumetric capacity such that upon attainment of each first actuation position, a substantially consistent quantity of said fluent material is deposited into said discharge compartment from said storage compartment.

16. A dispenser according to claim 15, wherein said predetermined volumetric capacity is up to one tablespoon.

17. A dispenser according to claim 15, wherein said predetermined volumetric capacity is between approximately one eighth and one half of a teaspoon.

18. A dispenser according to claim 1, wherein said biased articulating member is a spring coupled to said actuation mechanism.

19. A dispenser according to claim 1, wherein said selective fluid communication between said discharge compartment and said storage compartment is effected by a flow cutoff member disposed therebetween.

20. A dispenser according to claim 1, wherein said actuation mechanism comprises a rotatable member configured such that said discharge compartment is disposed within said rotatable member.

21. A dispenser according to claim 20, wherein said rotatable member rotates in response to a linear pushing motion from an actuator.

22. A dispenser according to claim 20, wherein said rotatable member rotates in response to a turning motion from an actuator.

23. An integrated dispensing system comprising:
a disposable dispenser comprising:
a reservoir configured to sealingly contain a fluent material therein, said reservoir comprising:
a storage compartment; and
a discharge compartment in selective fluid communication with said storage compartment; and
an actuation mechanism operatively coupled to said reservoir, said actuation mechanism comprising a biased articulating member such that together said reservoir and said actuation mechanism are configured such that in a first actuation position said storage compartment is in fluid communication with said discharge compartment to effect a filling thereof, and in a second actuation position said discharge compartment is in fluid communication with an ambient environment to permit said fluent material to be discharged thereto; and
a detachable mounting base configured to engage a surface of said dispenser, wherein said mounting base comprises a closure detent configured such that upon its insertion into said discharge compartment after at least a substantial majority of said fluent material has been discharged therefrom, said dispenser is locked into said second actuation position; and
a fluent material sealingly disposed in at least a portion of said reservoir.

24. A dispensing system according to claim 23, wherein said fluent material is a dry material.

25. A dispensing system according to claim 24, wherein said dry material comprises a dietary supplement and an inert carrier.

26. A dispensing system according to claim 24, wherein said dry material has been agglomerated prior to being disposed in said portion of said reservoir.

27. A method of dispensing a fluent material, comprising the steps of:
configuring a dispenser to include said fluent material therein, said dispenser comprising:
a reservoir configured to sealingly contain a fluent material therein, said reservoir comprising:
a storage compartment; and
a discharge compartment in selective fluid communication with said storage compartment;
an actuation mechanism operatively coupled to said reservoir, said actuation mechanism comprising a biased articulating member such that together said reservoir and said actuation mechanism are configured such that in a first actuation position said storage compartment is in fluid communication with said discharge compartment to effect a filling thereof, and in a second actuation position said discharge compartment is in fluid communication with an ambient environment to permit said fluent material to be discharged thereto; and
a detachable mounting base configured to engage a surface of said dispenser, wherein said mounting base comprises a closure detent configured such that upon its insertion into said discharge compartment after at least a substantial majority of said fluent material has been discharged therefrom, said dispenser is locked into said second actuation position;
grasping said dispenser such that it is situated above an area to receive said fluent material; and
actuating said dispenser such that said fluent material is discharged from said reservoir and onto said area.

28. A method according to claim 27, wherein said fluent material is dispensed in approximately one-half teaspoon increments.

29. A method according to claim 27, comprising the additional step of coupling a mounting base to said discharge compartment to prevent subsequent spilling of residual fluent material still in said discharge compartment.

30. A method according to claim 29, wherein said step of coupling said mounting base to said discharge compartment is performed while said dispenser is in said second actuation position.

31. A method of packaging a fluent material in a dispenser, comprising the steps of:
configuring a dispenser to comprise:
a reservoir configured to sealingly contain a fluent material therein, said reservoir comprising:
a storage compartment; and
a discharge compartment in selective fluid communication with said storage compartment; and
an actuation mechanism operatively coupled to said reservoir, said actuation mechanism comprising a biased articulating member such that together said reservoir and said actuation mechanism are configured such that in a first actuation position said storage compartment is in fluid communication with said discharge compartment to effect a filling thereof, and in a second actuation position said discharge compartment is in fluid communication with an ambient environment to permit said fluent material to be discharged thereto; and
a detachable mounting base configured to engage a surface of said dispenser, wherein said mounting base comprises a closure detent configured such that upon its insertion into said discharge compartment after at least a substantial majority of said fluent material has been discharged therefrom, said dispenser is locked into said second actuation position;
filling said reservoir with said fluent material; and
sealing said fluent material contained within said dispenser.

32. A method according to claim 31, wherein said fluent material is a dry powdered or granular material.

33. A method according to claim 32, wherein said dry powdered or granular material is a dietary supplement.

34. A method according to claim 32, wherein said dry powdered or granular material is a medicine.

35. A method according to claim 32, wherein said dry powdered or granular material is a food or digestible product.

36. A method according to claim 32, comprising the additional step of agglomerating said dry powder material prior to said step of filling said reservoir with said fluent material.

37. A method according to claim 31, comprising the additional step of placing at least one label on said dispenser.

38. A method according to claim 37, wherein said label includes dosing instructions.

39. A method according to claim 31, further comprising the steps of:
configuring said mounting base such that a frictional fit between said mounting base and said dispenser can be formed; and
engaging said mounting base to said dispenser.

40. A method according to claim 39, wherein said mounting base is made from a material that is compliant relative to a material making up said dispenser such that a substantial seal is formed between said mounting base and said dispenser.

41. A method according to claim 40, wherein said closure detent is configured to engage said discharge compartment such that said substantial seal is formed between said closure detent and said discharge compartment.

42. A method according to claim 31, wherein said step of sealing said fluent material contained within said dispenser comprises permanently connecting a cover to said reservoir.

* * * * *